(12) United States Patent
Nakamura et al.

(10) Patent No.: US 7,034,635 B2
(45) Date of Patent: Apr. 25, 2006

(54) ANTENNA DUPLEXER, DESIGN METHOD FOR ANTENNA DUPLEXER, PRODUCTION METHOD FOR ANTENNA DUPLEXER, AND COMMUNICATION APPARATUS USING THE SAME

(75) Inventors: Hiroyuki Nakamura, Osaka (JP); Shun-Ichi Seki, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 111 days.

(21) Appl. No.: 10/829,762

(22) Filed: Apr. 22, 2004

(65) Prior Publication Data

US 2004/0251987 A1 Dec. 16, 2004

(30) Foreign Application Priority Data

Apr. 25, 2003 (JP) ............................. 2003-122989

(51) Int. Cl.
*H03H 9/70* (2006.01)

(52) U.S. Cl. ..................... 333/133; 333/126; 333/129

(58) Field of Classification Search ................. 333/133
See application file for complete search history.

(56) References Cited

U.S. PATENT DOCUMENTS

| | | | | |
|---|---|---|---|---|
| 4,320,365 | A * | 3/1982 | Black et al. | 333/187 |
| 5,910,756 | A * | 6/1999 | Ella | 333/133 |
| 6,057,744 | A * | 5/2000 | Ikada | 333/133 |
| 6,469,593 | B1 * | 10/2002 | Nishizawa et al. | 333/133 |
| 6,472,954 | B1 * | 10/2002 | Ruby et al. | 333/133 |
| 6,489,861 | B1 * | 12/2002 | Noguchi et al. | 333/133 |
| 6,714,098 | B1 * | 3/2004 | Nishida et al. | 333/133 |
| 6,765,456 | B1 * | 7/2004 | Ehara et al. | 333/133 |
| 2004/0127178 | A1 * | 7/2004 | Kuffner | 455/133 |

FOREIGN PATENT DOCUMENTS

| | | |
|---|---|---|
| JP | 62-136105 | 6/1987 |
| JP | 6-350305 | 12/1994 |
| JP | 6-350306 | 12/1994 |
| JP | 6-350307 | 12/1994 |
| JP | 2002-164710 | 6/2002 |

OTHER PUBLICATIONS

T. Ikada et al, "A Miniaturized Dielectric Monoblock Duplexer for 1.9GHz Band PCS Telephone System", The Institute of Electronics, Information and Communication Engineers, Technical Report of IEICE, pp. 55–60 (1996).

H. Matsumoto et al. "A Miniaturized Dielectric Monoblock Duplexer Matched by the Burled Impedance Transforming Circuit", IEEE MTT-S Digest, pp. 15391542 (1995).

* cited by examiner

*Primary Examiner*—Barbara Summons
(74) *Attorney, Agent, or Firm*—RatnerPrestia

(57) ABSTRACT

An antenna duplexer including: a transmission filter, a reception filter, phase-shift circuits of adjusting phase characteristics on a transmission side and a reception side; and a junction point of connecting an antenna, wherein (1) an absolute value θ1 of a difference between a first phase at a predetermined frequency of a pass band of the first filter and a second phase at the predetermined frequency at the time when the reception filter side is viewed from the junction point and (2) an absolute value θ2 of a difference between a third phase at a predetermined frequency of a pass band of the reception filter and a fourth phase at the predetermined frequency at the time when the transmission filter side is viewed from the junction point is included in a range of 100 degrees or more and 170 degrees or less.

29 Claims, 24 Drawing Sheets

θT1 : PHASE OF AN IMPEDANCE AT A CERTAIN FREQUENCY OF A PASS BAND OF A TRANSMISSION FILTER AT THE TIME WHEN THE TRANSMISSION FILTER SIDE IS VIEWED FROM A JUNCTION POINT

θR2 : PHASE OF AN IMPEDANCE AT A CERTAIN FREQUENCY OF A TRANSMISSION ATTENUATION BAND AT THE TIME WHEN A RECEPTION FILTER SIDE IS VIEWED FROM THE JUNCTION POINT

Fig. 3 (a) θT1=0
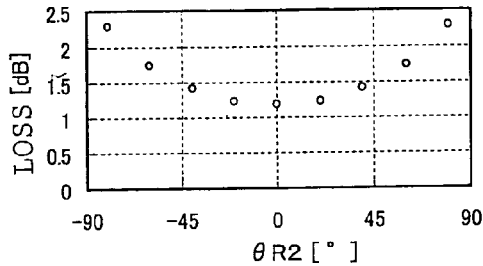
Fig. 3 (b) θT1= 45 DEGREES
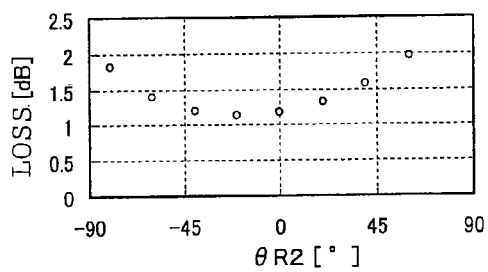
Fig. 3 (c) θT1= 90 DEGREES
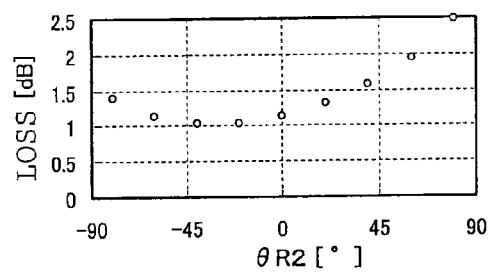
Fig. 3 (d) θT1= 135 DEGREES
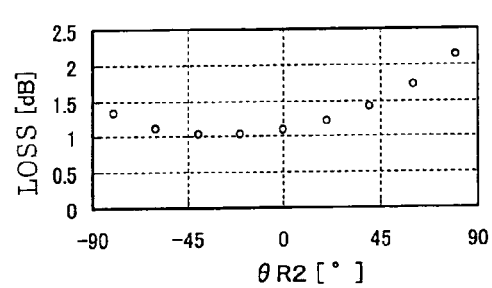
Fig. 3 (e) θT1= 180 DEGREES
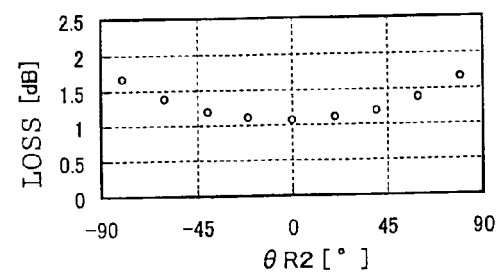
Fig. 3 (f) θT1= −45 DEGREES
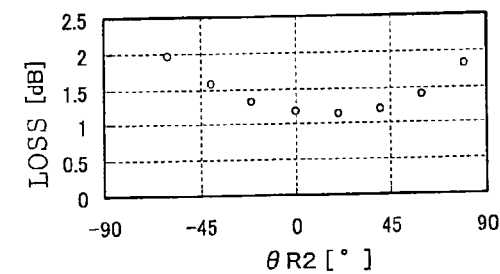
Fig. 3 (g) θT1= −90 DEGREES
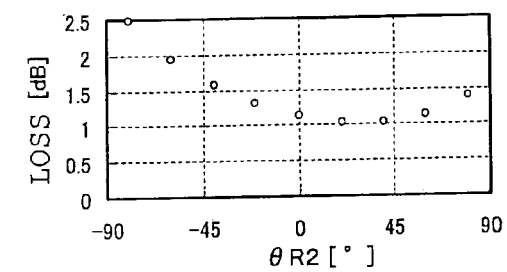
Fig. 3 (h) θT1= −135 DEGREES
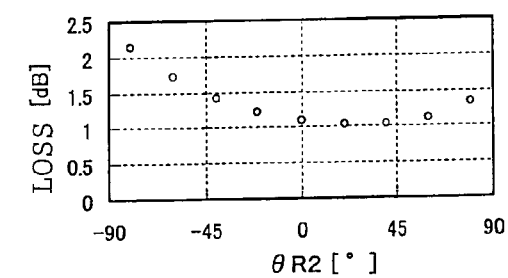

θR1 : PHASE OF AN IMPEDANCE AT A CERTAIN FREQUENCY OF A PASS BAND OF A RECEPTION FILTER AT THE TIME WHEN THE RECEPTION FILTER SIDE IS VIEWED FROM A JUNCTION POINT

θT2 : PHASE OF AN IMPEDANCE AT A CERTAIN FREQUENCY OF A RECEPTION ATTENUATION BAND AT THE TIME WHEN A TRANSMISSION FILTER SIDE IS VIEWED FROM THE JUNCTION POINT

Fig. 5(a) θR1=0
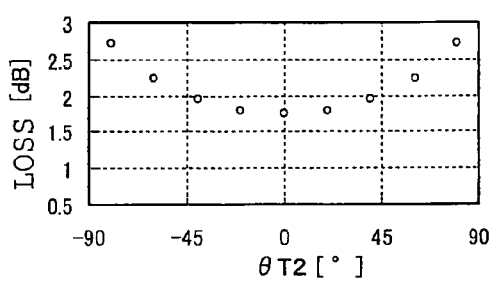
Fig. 5(b) θR1= 45 DEGREES
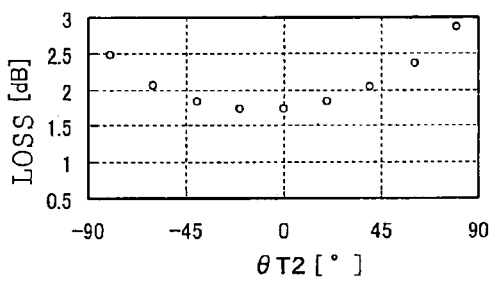
Fig. 5(c) θR1= 90 DEGREES
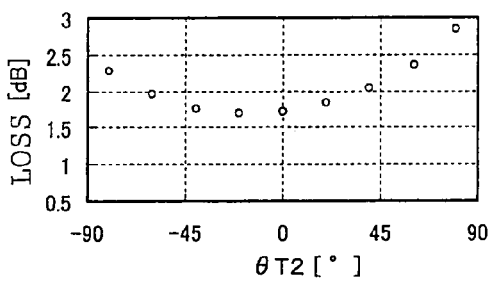
Fig. 5(d) θR1= 135 DEGREES
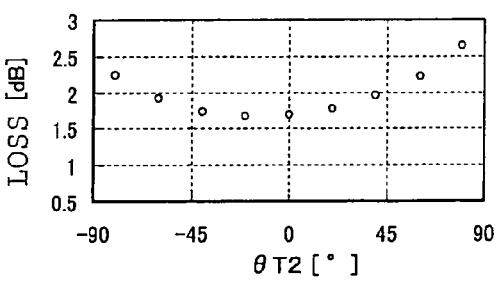
Fig. 5(e) θR1= 180 DEGREES
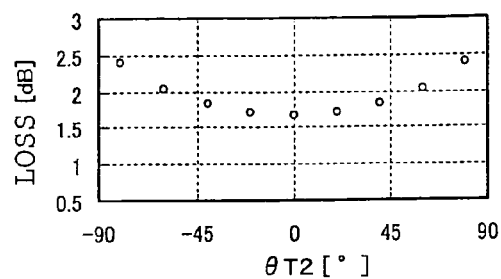
Fig. 5(f) θR1= -45 DEGREES
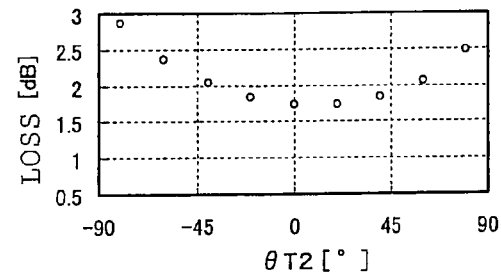
Fig. 5(g) θR1= -90 DEGREES
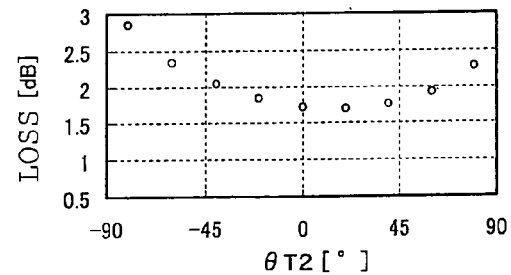
Fig. 5(h) θR1= -135 DEGREES
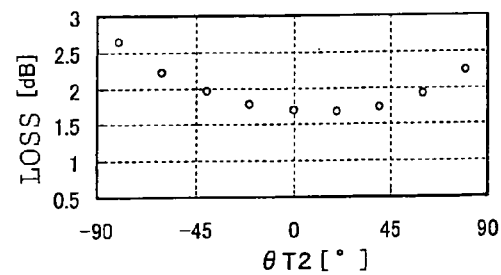

Fig. 6

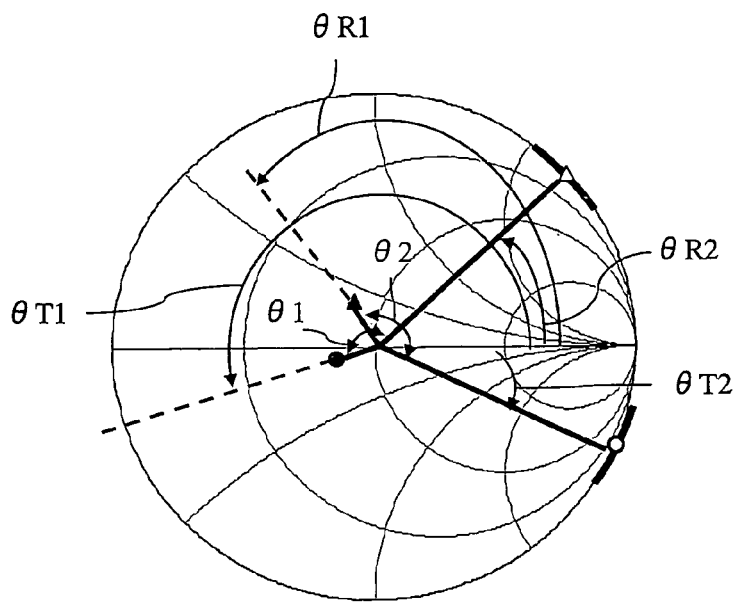

θT1 : PHASE OF AN IMPEDANCE AT A CERTAIN FREQUENCY OF A PASS BAND OF A TRANSMISSION FILTER AT THE TIME WHEN THE TRANSMISSION FILTER SIDE IS VIEWED FROM A JUNCTION POINT

θT2 : PHASE OF AN IMPEDANCE AT A CERTAIN FREQUENCY OF A RECEPTION ATTENUATION BAND AT THE TIME WHEN A TRANSMISSION FILTER SIDE IS VIEWED FROM THE JUNCTION POINT

θR1 : PHASE OF AN IMPEDANCE AT A CERTAIN FREQUENCY OF A PASS BAND OF A RECEPTION FILTER AT THE TIME WHEN THE RECEPTION FILTER SIDE IS VIEWED FROM A JUNCTION POINT

θR2 : PHASE OF AN IMPEDANCE AT A CERTAIN FREQUENCY OF A TRANSMISSION ATTENUATION BAND AT THE TIME WHEN A RECEPTION FILTER SIDE IS VIEWED FROM THE JUNCTION POINT

Fig. 7

| TRANSMISSION FILTER PHASE | | RECEPTION FILTER PHASE | | TRANSMISSION LOSS | RECEPTION LOSS |
|---|---|---|---|---|---|
| θT2 ATTENUATION (819MHz) | θT1 PASSAGE (949MHz) | θR2 ATTENUATION (949MHz) | θR1 PASSAGE (819MHz) | 949[MHz] | 819[MHz] |
| −60 | θT1,1 | 60 | θR1,1 | LT1 | LR1 |
| −40 | θT1,2 | 40 | θR1,2 | LT2 | LR2 |
| −30 | θT1,3 | 30 | θR1,3 | LT3 | LR3 |
| −20 | θT1,4 | 20 | θR1,4 | LT4 | LR4 |
| −10 | θT1,5 | 10 | θR1,5 | LT5 | LR5 |
| 0 | θT1,6 | 0 | θR1,6 | LT6 | LR6 |
| 10 | θT1,7 | −10 | θR1,7 | LT7 | LR7 |
| 20 | θT1,8 | −20 | θR1,8 | LT8 | LR8 |
| 30 | θT1,9 | −30 | θR1,9 | LT9 | LR9 |
| 40 | θT1,10 | −40 | θR1,10 | LT10 | LR10 |
| 50 | θT1,11 | −50 | θR1,11 | LT11 | LR11 |
| 60 | θT1,12 | −60 | θR1,12 | LT12 | LR12 |
| 80 | θT1,13 | −80 | θR1,13 | LT13 | LR13 |

Fig. 8

| | TRANSMISSION FILTER PHASE | | RECEPTION FILTER PHASE | | TRANSMISSION LOSS | RECEPTION LOSS |
|---|---|---|---|---|---|---|
| | θT2 ATTENUATION (810MHz) | θT1 PASSAGE (940MHz) | θR2 ATTENUATION (940MHz) | θR1 PASSAGE (810MHz) | 940[MHz] | 810[MHz] |
| | −48.8 | θ'T1,1 | 82.3 | θ'R1,1 | L'T1 | L'R1 |
| | −29 | θ'T1,2 | 62.4 | θ'R1,2 | L'T2 | L'R2 |
| | −19.1 | θ'T1,3 | 52.5 | θ'R1,3 | L'T3 | L'R3 |
| | −9.2 | θ'T1,4 | 42.6 | θ'R1,4 | L'T4 | L'R4 |
| | 0.7 | θ'T1,5 | 32.7 | θ'R1,5 | L'T5 | L'R5 |
| | 10.6 | θ'T1,6 | 22.8 | θ'R1,6 | L'T6 | L'R6 |
| | 20.5 | θ'T1,7 | 12.9 | θ'R1,7 | L'T7 | L'R7 |
| | 30.4 | θ'T1,8 | 3 | θ'R1,8 | L'T8 | L'R8 |
| | 40.3 | θ'T1,9 | −6.9 | θ'R1,9 | L'T9 | L'R9 |
| | 50.1 | θ'T1,10 | −16.8 | θ'R1,10 | L'T10 | L'R10 |
| | 60 | θ'T1,11 | −26.7 | θ'R1,11 | L'T11 | L'R11 |
| | 69.9 | θ'T1,12 | −36.6 | θ'R1,12 | L'T12 | L'R12 |
| | 89.7 | θ'T1,13 | −56.4 | θ'R1,13 | L'T13 | L'R13 |

LOSS CHARACTERISTIC OF TRANSMISSION FILTER AT 949 MHz

LOSS CHARACTERISTIC OF RECEPTION FILTER AT 819 MHz

LOSS CHARACTERISTIC OF TRANSMISSION FILTER AT 940 MHz

← 1.39

LOSS CHARACTERISTIC OF RECEPTION FILTER AT 810 MHz

← 1.97

LOSS CHARACTERISTIC OF TRANSMISSION FILTER AT 1441 MHz

LOSS CHARACTERISTIC OF RECEPTION FILTER AT 1489 MHz

θT1=0

θT1= 45 DEGREES

θT1= 90 DEGREES

θT1= 135 DEGREES

θT1= 180 DEGREES

θT1= -45 DEGREES

θT1= -90 DEGREES

θT1= -135 DEGREES

1301a : PHASE OF AN IMPEDANCE IN A TRANSMISSION ATTENUATION
        BAND AT THE TIME WHEN A RECEPTION FILTER SIDE IS VIEWED
        FROM A JUNCTION POINT

1302a : PHASE OF AN IMPEDANCE IN A RECEPTION ATTENUATION BAND
        AT THE TIME WHEN A TRANSMISSION FILTER SIDE IS VIEWED
        FROM A JUNCTION POINT

Fig. 21 (a) PRIOR ART
TRANSMISSION FILTER SIDE
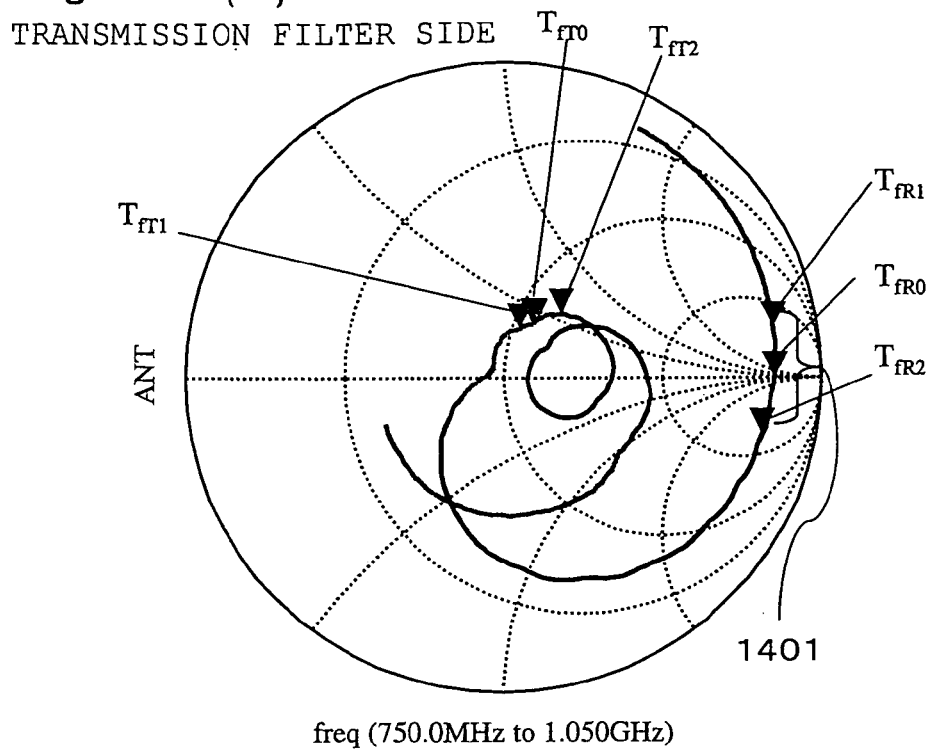
freq (750.0MHz to 1.050GHz)
Fig. 21 (b) PRIOR ART
RECEPTION FILTER SIDE
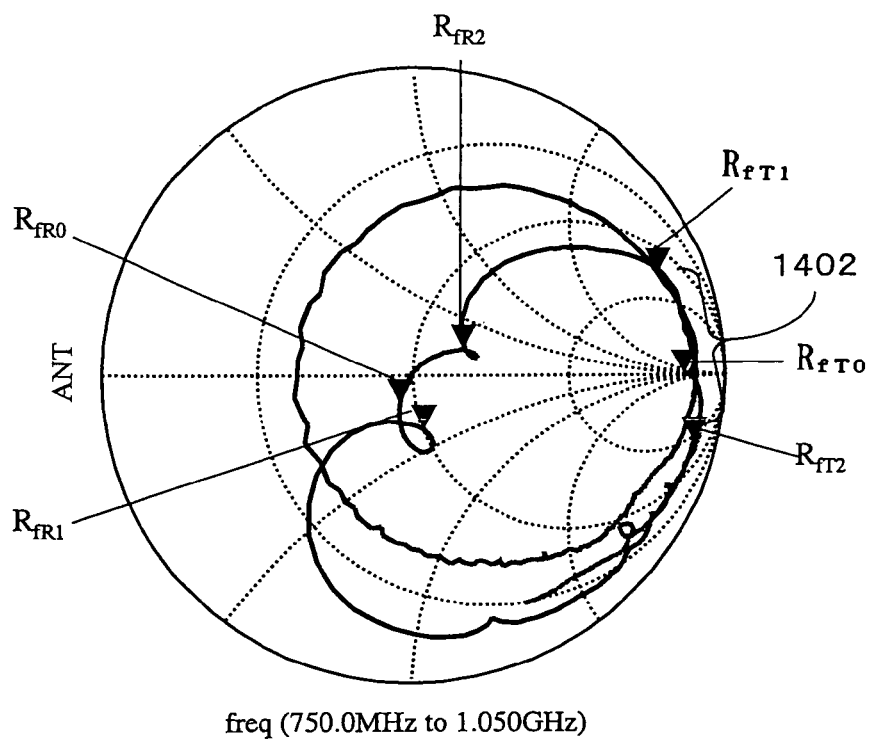
freq (750.0MHz to 1.050GHz)

ANTENNA DUPLEXER, DESIGN METHOD FOR ANTENNA DUPLEXER, PRODUCTION METHOD FOR ANTENNA DUPLEXER, AND COMMUNICATION APPARATUS USING THE SAME

BACKGROUND OF THE INVENTION

1. Field of the Invention

The present invention relates to an antenna duplexer, a design method for the antenna duplexer, a production method for the antenna duplexer, a diplexer, a design method for the diplexer, a production method for the diplexer, and a communication apparatus.

2. Related Art of the Invention

In recent years, with the development of mobile communication, further miniaturization and improvement of performance of mobile communication apparatuses including a cellular phone has been requested.

An antenna duplexer 1100 used in such mobile communication apparatuses generally has a structure which comprises a transmission filter 1101, a reception filter 1102, phase-shift circuits 1103 and 1104 of adjusting phases of a transmission side and a reception side, and a junction point 1106 of connecting an antenna 1105, as shown in FIG. 18.

It has been considered desirable to design such a conventional antenna duplexer 1100 such that, in order to realize matching of impedances on the transmission side and the reception side, for example, in a transmission frequency band, an impedance at the time when the transmission filter 1101 side is viewed from the junction point 1106 is a value in the vicinity of 50Ω and an impedance at the time when the reception filter 1102 side is viewed from the junction point 1106 is close to infinity as much as possible. In a reception frequency band, according to the same idea, the antenna duplexer 1101 is designed such that the impedance at the time when the reception filter 1102 is viewed from the junction point 1106 is a value in the vicinity of 50Ω and an impedance at the time when the reception filter 1102 side is viewed from the junction point 1106 is close to infinity as much as possible (e.g., see Japanese Patent Application Laid-Open Nos. 2002-164710 (FIG. 3, etc.), 6-350305,6-350306, and 62-136105, the disclosures of which are incorporated herein by reference in their entireties). FIG. 19 is a schematic diagram showing, of the impedance characteristics of the antenna duplexer, an impedance on the reception filter 1102 side in the transmission frequency band (this impedance will be referred to as "impedance in a transmission attenuation band" in this specification) and an impedance on the transmission filter 1101 side in the reception frequency band (this impedance will be referred to as "impedance in a reception attenuation band" in this specification) on a Smith chart denoting the impedances with reference numeral 1201. These impedances 1201 in the transmission attenuation band and the reception attenuation band (this will be simply referred to as the impedance 1201 in an attenuation band) are indicated by a bold solid line on a circumference of the Smith chart in the figure.

Note that this impedance 1201 in the attenuation band has been considered ideal to set an impedance to infinity in the conventional design method. In addition, this bold solid line has a predetermined length because the attenuation bands for transmission and reception have widths of frequencies, respectively, and characteristics of both the attenuation bands overlap on the chart.

On the other hand, FIG. 20 shows a conventional example in which it is attempted to realize appropriateness of impedance matching from a viewpoint different from the above-mentioned conventional example.

In the conventional example shown in the figure, an antenna duplexer is designed such that a phase 1301a of an impedance 1301 in the transmission attenuation band of the reception filter 1102 and a phase 1302a of an impedance 1302 in the reception attenuation band of the transmission filter 1101 are vertically symmetrical with respect to a real axis 1303 of the Smith chart (e.g., see "A Miniaturized Dielectric Monoblock Duplexer for 1.9 GHz Band PCS Telephone System", Takahiro Okada and two others, Nov. 7, 1996, Research Report of the Institute of Electronics, Information and Communication Engineers, Shingaku Giho CPM96-103, p. 55 to 60 (FIG. 7, Section 3.2.3, etc.), the disclosure of which is incorporated herein by reference in its entirety).

However, when the structure of the conventional example described with reference to FIG. 19 is adopted, it is difficult to realize sufficient matching in an entire range of a pass band because, for example, an impedance cannot be set to infinity actually and a frequency of an attenuation band has a predetermined width.

This point will be further described with reference to FIGS. 21(*a*) and 21(*b*).

Here, in FIG. 21(*a*), positions on a Smith chart of respective impedances at respective frequencies ($f_{T1}<f_{T0}<f_{T2}$) of a lower limit, a center, and an upper limit of a pass band of a transmission filter are denoted by reference signs $T_{fT1}$, $T_{fT0}$ and $T_{fT2}$. In addition, in FIG. 21(*b*), positions on a Smith charge of respective impedances at respective frequencies ($f_{R1}<f_{R0}<f_{R2}$) of a lower limit, a center, and an upper limit of a pass band of a reception filter are denoted by reference signs $R_{fR1}$, $R_{fR0}$ and $R_{fR2}$.

These positions are adjusted to be located in the vicinity of a center of the Smith chart. A phase-shift circuit is designed such that respective phases of the impedance (denoted by reference sign $T_{fR0}$) at the frequency $f_{R0}$ in the reception attenuation band 1401 of the transmission filter and the impedance (denoted by reference sign $R_{fT0}$) at the frequency $f_{T0}$ in the transmission attenuation band 1402 of the reception filter are 0 degree. However, the pass band and the attenuation band have widths of frequencies, and phases of the impedances at the respective frequencies are as described below. In the transmission filter of FIG. 21(*a*), a phase in a position denoted by reference sign $T_{fR1}$ is 10.6 degrees, and a phase in a position denoted by reference sign $T_{fR2}$ is −12.4 degrees. In the reception filter of FIG. 21(*b*), a phase in a position denoted by reference sign $R_{fT1}$ is 22.8 degrees, and a phase in a position denoted by reference sign $R_{fT2}$ is −13.7 degrees. All phases in the attenuation band 1401 and all phases in the attenuation band 1402 are not 0 degrees, that is, are not in a position of an open state.

In addition, concerning the conventional example shown in FIG. 20, it is difficult to design the antenna duplexer such that the positions of the impedances on the Smith chart are completely symmetrical in plural frequencies.

Further, in both FIGS. 19 and 20, since the antenna duplexer is designed taking into account only the impedances in the attenuation band, there is a doubt whether the antenna duplexer is optimized such that a signal loss is minimized in plural frequencies.

SUMMARY OF THE INVENTION

The present invention has been devised in view of such problems of the conventional antenna duplexer, and it is an object of the present invention to provide an antenna duplexer, a design method for the antenna duplexer, a production method for the antennal duplexer, a diplexer, a design method for the diplexer, a production method for the diplexer, and a communication apparatus which can reduce a signal loss more compared with the conventional examples.

The 1$^{st}$ aspect of the present invention is an antenna duplexer comprising:

a transmission filter of receiving a transmission signal and passing a signal of a predetermined pass band; and a reception filter of receiving a reception signal obtained from an antenna and passing a signal of a predetermined pass band, wherein (1) an absolute value of θ1 of a difference between a first phase of an impedance at a predetermined frequency of said pass band of said transmission filter at the time when said transmission filter side is viewed from an antenna terminal portion of connecting said antenna and a second phase of an impedance at said predetermined frequency at the time when said reception filter side is viewed from said antenna terminal portion and/or (2) an absolute value θ2 of a difference between a third phase of an impedance at a predetermined frequency of said pass band of said reception filter at the time when said reception filer side is viewed from said antenna terminal portion and a fourth phase of an impedance at said predetermined frequency at the time when said transmission filter side is viewed from said antenna terminal portion is included in a range of 100 degrees or more and 170 degrees or less.

The 2$^{nd}$ aspect of the present invention is a design method for an antenna duplexer comprising (1) a transmission filter of receiving a transmission signal and passing a signal of a predetermined pass band; and (2) a reception filter of receiving a reception signal obtained from an antenna and passing a signal of a predetermined pass band, wherein said design method for an antenna duplexer performs design of said antenna duplexer such that (a) a relation between a first phase of an impedance at a predetermined frequency of said pass band of said transmission filter at the time when said transmission filter side is viewed from an antenna terminal portion of connecting said antenna and a second phase of an impedance at said predetermined frequency at the time when said reception filter side is viewed from said antenna terminal portion and/or (b) a relation between a third phase of an impedance at a predetermined frequency of said pass band of said reception filter at the time when said reception filer side is viewed from an antenna connection portion and a fourth phase of an impedance at said predetermined frequency at the time when said transmission filter side is viewed from said antenna terminal portion satisfies a fixed rule.

The 3$^{rd}$ aspect of the present invention is a production method for an antenna duplexer having a transmission filter of receiving a transmission signal and passing a signal of a predetermined pass band; and a reception filter of receiving a reception signal obtained from an antenna and passing a signal of a predetermined pass band, said production method comprising:

a design step of designing said antenna duplexer such that (1) a relation between a first phase of an impedance at a predetermined frequency of the pass band of said transmission filter at the time when said transmission filter side is viewed from an antenna terminal portion of connecting said antenna and a second phase of an impedance at said predetermined frequency at the time when said reception filter side is viewed from said antenna terminal portion and/or (2) a relation between a third phase of an impedance at a predetermined frequency of said pass band of said reception filter at the time when said reception filer side is viewed from said antenna connection portion and a fourth phase of an impedance at said predetermined frequency at the time when said transmission filter side is viewed from said antenna terminal portion satisfies a fixed rule; and an assembly step of performing assembling of said designed antenna duplexer.

The 4$^{th}$ aspect of the present invention is a diplexer comprising:

branching means of branching an input signal to be inputted to one side and the other side;

a first filter of passing a signal of a first pass band of said signal branched to one side; and a second filer of passing a signal of a second pass band of said signal branched to the other side wherein (1) an absolute value of θ1 of a difference between a first phase of an impedance at a predetermined frequency of said pass band of said first filter at the time when said first filter side is viewed from said branching means and a second phase of an impedance at said predetermined frequency at the time when said second filter side is viewed from said branching means and/or (2) an absolute value θ2 of a difference between a third phase of an impedance at a predetermined frequency of said pass band of said second filter at the time when said second filer side is viewed from said branching means and a fourth phase of an impedance at said predetermined frequency at the time when said first filter side is viewed from said branching means is included in a range of 100 degrees or more and 170 degrees or less.

The 5$^{th}$ aspect of the present invention is a design method for a diplexer comprising (1) branching means of branching an input signal to be inputted to one side and the other side; (2) a first filter of passing a signal of a first pass band of said signal branched to one side; and (3) a second filter of passing a signal of a second pass band of said signal branched to the other side, wherein said production method performs design of said diplexer such that (a) a relation between a first phase of an impedance at a predetermined frequency of said pass band of said first filter at the time when said first filter side is viewed from said branching means and a second phase of an impedance at said predetermined frequency at the time when said second filter side is viewed from said branching means and/or (b) a relation between a third phase of an impedance at a predetermined frequency of said pass band of said second filter at the time when said second filter side is viewed from said branching means and a fourth phase of an impedance at said predetermined frequency at the time when said first filter side is viewed from said branching means satisfies a fixed rule.

The 6$^{th}$ aspect of the present invention is a production method for a diplexer comprising: (1) branching means of branching an input signal to be inputted to one side and the other side; (2) a first filter of passing a signal of a first pass band of said signal branched to one side; and (3) a second filter of passing a signal of a second pass band of said signal branched to the other side, the production method comprising:

a design step of designing said diplexer such that (a) a relation between a first phase of an impedance at a predetermined frequency of said pass band of said first filter at the time when said first filter side is viewed from said branching means and a second phase of an impedance at said predetermined frequency in at the time when said second filter side is viewed from said branching means and/or (b) a relation between a third phase of an impedance at a predetermined frequency of said pass band of said second filter at the time when said second filter side is viewed from said branching means and a fourth phase of an impedance at said predetermined frequency at the time when said first filter side is viewed from said branching means satisfies a fixed rule; and an assembly step of performing assembling of said designed diplexer.

The 7th aspect of the present invention is a communication apparatus comprising:

an antenna;

the antenna duplexer according to claim 1 or 2 connected to said antenna;

a transmission circuit connected to a transmission side of said antenna duplexer; and a reception circuit connected to a reception side of said antenna duplexer.

As it is evident from the above, according to the present invention, there is an advantage that a signal loss can be reduced more compared with the conventional examples.

BRIEF DESCRIPTION OF THE DRAWINGS

FIGS. 3(a) to 3(h) are diagrams showing relations between the respective phases shown in FIG. 2 and a signal loss in the case in which the phase $\theta T1$ is fixed to respective values;

FIGS. 5(a) to 5(h) are diagrams showing relations between the respective phases shown in FIG. 4 and a signal loss in the case in which a phase $\theta R1$ is fixed to respective values;

FIG. 6 is a diagram showing the respective phases shown in FIGS. 2 and 4 on one Smith chart simultaneously;

FIG. 7 is a diagram showing changes in the phases $\theta T1$ and $\theta R1$, a transmission loss, and a reception loss of the pass bands of the respective filters in the case in which frequencies of respective signals to be inputted to the transmission filter and the reception filter are fixed to 949 MHz and 819 MHz, respectively, and the phases $\theta R2$ and $\theta T2$ are changed, respectively, in the first embodiment;

FIG. 8 is a diagram corresponding to FIG. 7 in the case in which frequencies of respective signals to be inputted to the transmission filter and the reception filer are fixed to 940 MHz and 810 MHz respectively, in the first embodiment;

FIGS. 13(a) to 13 (h) are diagrams showing the relations between the phases and the transmission loss shown in FIGS. 3(a) to 3(h) in which the horizontal axis shows the phase difference $\theta 1$ (i.e., $\theta T1-\theta R2$) instead of the phases;

FIG. 21(a) is a Smith chart showing impedance characteristics at the time when the transmission filter side is viewed from a junction point in the conventional example shown in FIG. 19;

FIG. 21(b) is a Smith chart showing impedance characteristics at the time when the reception filter side is viewed from the junction point in the conventional example shown in FIG. 19;

Figure 1:
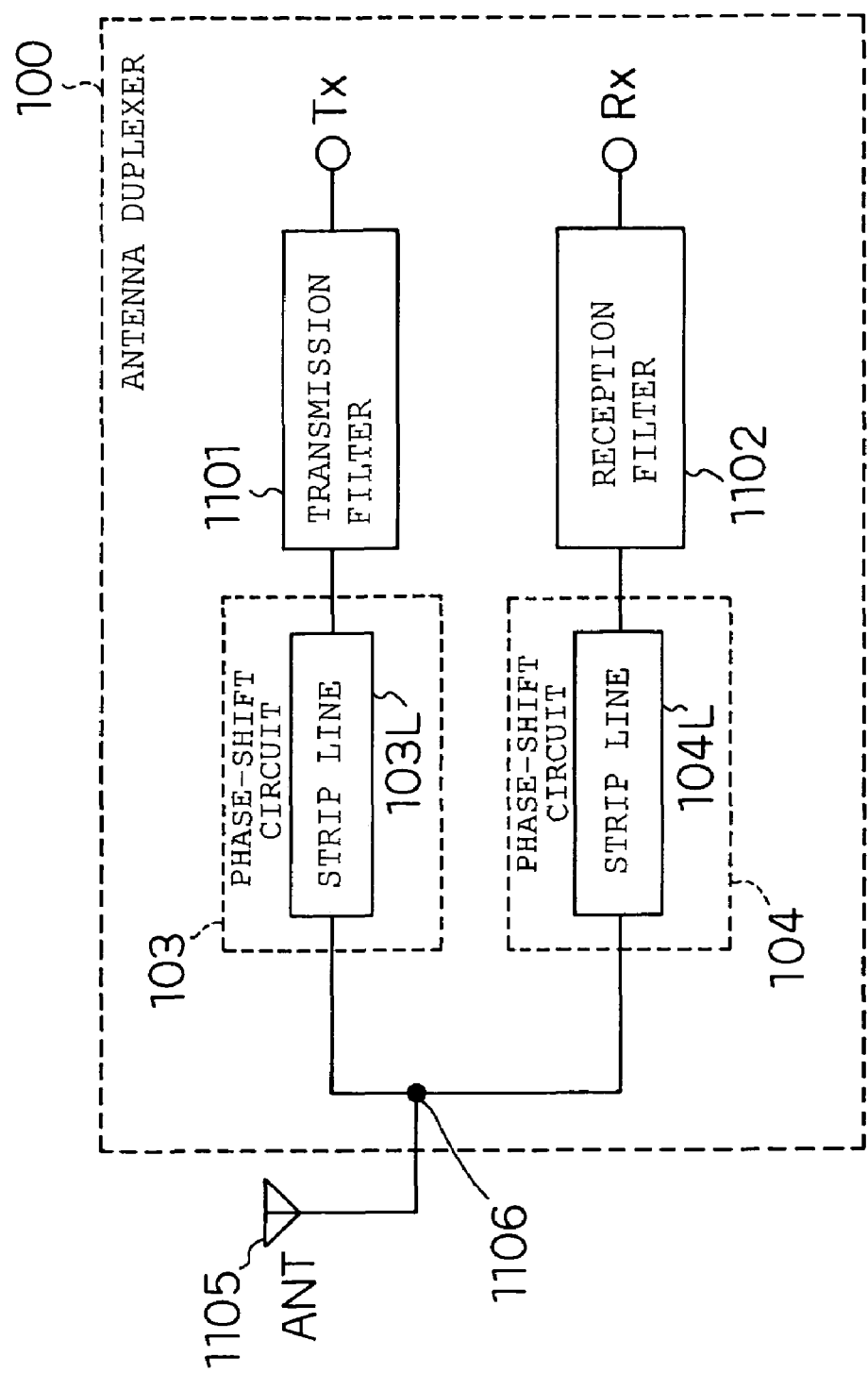
FIG. 1 is a block diagram of an antenna duplexer in a first embodiment of the present invention.

DESCRIPTION OF SYMBOLS 100, 200 antenna duplexer
103, 104, 201, 301, 302, 405, 406 phase-shift circuit
103L, 104L strip line
201L, 302L inductor element
301, 302 equivalent circuit
400 diplexer
401 input signal
402 branch point
403 first filter
404 second filter
407 first processing circuit
408 second processing circuit
500 communication apparatus
701, 801 central row
702, 802, 902 transmission loss
703, 803 reception loss
1100 conventional antenna duplexer 1101 transmission filter
1102 reception filter
1105 antenna
1106 junction point
1303 real axis
2001, 2001a, 200b thin film resonator
2010 upper electrode
2012 piezoelectric layer
2014 lower electrode
2016 substrate
2018 cavity
2020 resonating portion
3001 surface acoustic wave filter
3010, 4010 piezoelectric substrate
3012a first IDT electrode
3012b second IDT electrode
3012c third IDT electrode
3014a first reflector electrode
3014b second reflector electrode
3016 input terminal
3018 output terminal
4001 surface acoustic wave resonator
4012 IDT electrode
4014a, 4014b reflector electrode

PREFERRED EMBODIMENTS OF THE INVENTION

Embodiments of the present invention will be hereinafter described with reference to the accompanying drawings.

First Embodiment

FIG. 1 is a diagram showing a structure of an embodiment of an antenna duplexer of the present invention. A structure of an antenna duplexer 100 of this embodiment will be described with reference to the figure.

Figure 18:
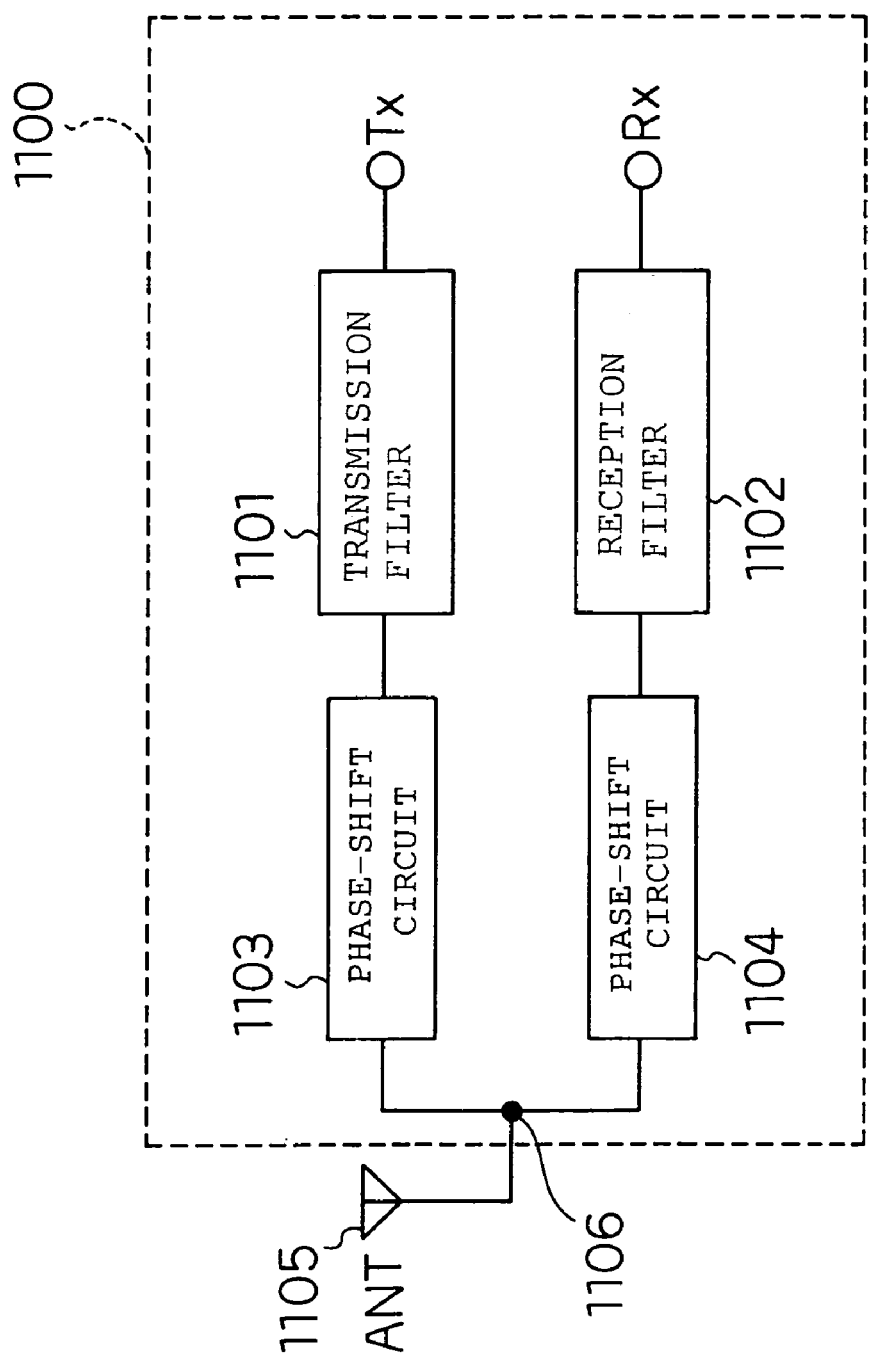
FIG. 18 is a block diagram of a conventional antenna duplexer.

Note that, in the structure shown in FIG. 1, components common to the structure shown in FIG. 18 are denoted by the same reference numerals and signs, and a description of the components will be omitted. Here, the description centers on phase-shift circuits 103 and 104.

As shown in FIG. 1, the phase-shift circuits 103 and 104 in this embodiment include strip lines 103L and 104L. The phase-shift circuits 103 and 104 are characterized in that the respective elements of the phase-shift circuits 103 and 104 are determined by a design method different from the conventional examples as described below. A structure itself of the respective elements is not essentially different from the conventional examples.

An embodiment of a design method of the antenna duplexer of the present invention will be hereinafter described centering on the phase-shift circuits 103 and 104 which are necessary for realizing the structure of the antenna duplexer 100.

Points of the design method of this embodiment are as described below, although details such as grounds thereof will be described later (see FIG. 6, etc.): (1) attention is directed to an absolute value θ1 of a difference (hereinafter referred to simply as phase difference θ1) between a phase θT1 of an impedance at a predetermined frequency $f_T$ of a pass band of the transmission filter 1101 at the time when the transmission filter 1101 side is viewed from the junction point 1106 (in this specification, this may be simply referred to as phase θT1) and a phase θR2 of an impedance at the frequency $f_T$ of a transmission attenuation band at the time when the reception filter 1102 side is viewed from the junction point 1106 (in this specification, this may be simply referred to as phase θR2); and (2) attention is directed to an absolute value θ2 of a difference (hereinafter referred to simply as phase difference θ2) between a phase θR1 of an impedance at a predetermined frequency $f_R$ of a pass band of the reception filter 1102 at the time when the reception filter 1102 side is viewed from the junction point 1106 (in this specification, this may be simply referred to as phase θR1) and a phase θT2 of an impedance at the frequency $f_R$ of a reception attenuation band at the time when the transmission filter 1101 side is viewed from the junction point 1106 (in this specification, this may be simply referred to as phase θR2). Further, the phase-shift circuits 103 and 104 are designed such that at least one of the phase differences θ1 and θ2 falls into a range of 100 degrees or more and 170 degrees or less, more preferably into a range of 120 degrees to 150 degrees. Consequently, regardless of a type of a frequency band of a filter, a signal loss can be reduced by a degree equal to or more than that in the conventional examples.

Note that a first phase, a second phase, a third phase and a fourth phase of the present invention correspond to the phase θT1, the phase θR2, the phase θR1, and the phase θT2 in an order of this description. In addition, an antenna terminal portion of the present invention corresponds to the junction point 1106 of this embodiment.

First, here, (A) before describing grounds from which the design method for the antenna duplexer of the present invention have been derived, in order to facilitate understanding of the grounds, contents of an objective evaluation with respect to the design method described as the conventional technique (see FIGS. 19 and 20) will be described one after another because the objective evaluation was performed on the basis of an original analysis method utilizing the structure of the antenna duplexer 100 of FIG. 1 for the sake of convenience.

Then, (B) the grounds for deriving the design method of the present invention will be described. Next, (C) this design method will be described generally. (D) It will be verified that this design method is applicable to different frequency bands. Lastly, (E) application of this design method will be described from a viewpoint of a range of the phase θT1 of the pass band of the filter.

Here, the description of above (A) will be made.

From the relation between the phase θT1 of the impedance in the pass band of the transmission filter 1101 at the time when the transmission filter 1101 side was viewed from the junction point 1106 and the phase θR2 of the impedance in the transmission attenuation band at the time when the reception filter 1102 side was viewed from the junction point 1106, a signal loss (also referred to as a transmission loss), which was caused in the transmission filter 1101, was evaluated what kind of characteristics the signal loss showed. This will be referred to as evaluation contents (1).

In addition, from the relation between the phase θR1 of the impedance in the pass band of the reception filter 1102 at the time when the reception filter 1102 side was viewed from the junction point 1106 and the phase θR2 of the impedance in the reception attenuation band at the time when the transmission filter 1101 side was viewed from the junction point 1106, a signal loss (also referred to as reception loss) which was caused in the reception filter 1102, was evaluated according to the same method as the evaluation contents (1). This will be hereinafter referred to as evaluation contents (2).

First, the evaluation contents (1) will be described with reference to FIG. 2 and FIGS. 3(a) to 3(h).

Figure 2:
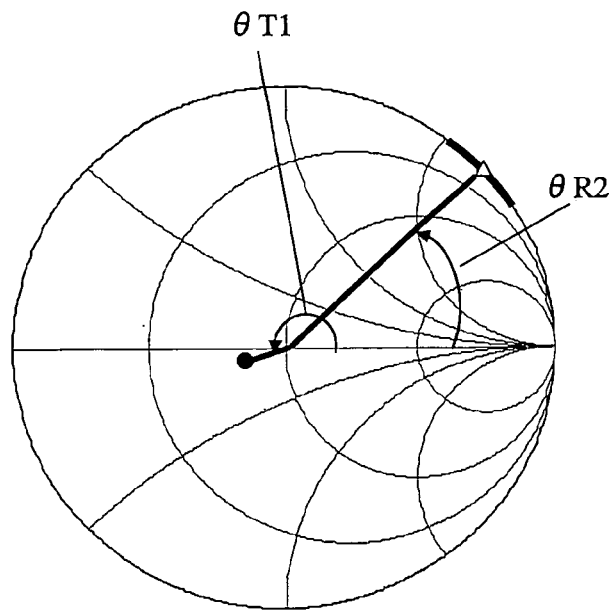
FIG. 2 is a diagram for explaining a phase $\theta T1$ of a pass band of a transmission filter and a phase $\theta R2$ of a transmission attenuation band on a reception filter side in the first embodiment.

FIG. 2 is a diagram for explaining the phase θT1 and the phase θR2. FIGS. 3(a) to 3(h) are diagrams showing a relation between the respective phases and a signal loss. In addition, for example, FIG. 3(a) shows how a signal loss change in the case in which the phase θR2 is changed in a state in which the phase θT1 is fixed to 0 degrees. Similarly, FIGS. 3(b) to 3(h) show how a signal loss changes in the case in which the phase θT1 is fixed to 45 degrees, 90 degrees, 135 degrees, 180 degrees, −45 degrees, −90 degrees, and −135 degrees.

Here, the above-described respective fixed values of the phase θT1 are values which are obtained in association with predetermined frequencies in the pass band of the transmission filter 1101. In addition, the phase θR2 is changed mainly by adjusting a length of the strip line 104L or the like.

It is seen that, in the case in which the phase θT1 is fixed to 0 degrees or 180 degrees as shown in FIGS. 3(a) and 3(e), the signal loss is minimized (in FIG. 3(a), about 1.2 dB) when the phase θR2 is 0 degrees. On the other hand, it is seen that, for example, in the case in which the phase θT1 is fixed to −90 degrees as shown in FIG. 3(g), the signal loss is minimized (in FIG. 3(g), about 1 dB) when the phase θR2 is about 30 degrees.

Judging from the above, the signal loss is not always minimized in all the frequencies of the pass band of the transmission filter 1101 when the phase θR2 of the impedance in the transmission attenuation band of the reception filter 1102 is 0 degrees.

Figure 19:
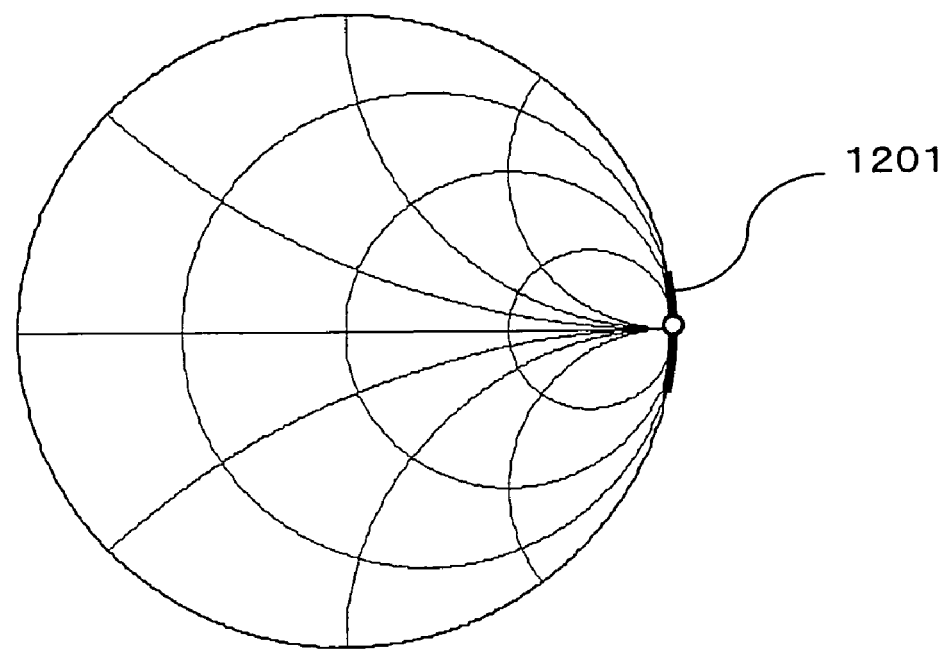
FIG. 19 is a schematic diagram showing, of impedance characteristics of the conventional antenna duplexer, phase characteristics of an impedance of a transmission attenuation band on a reception filter side and phase characteristics of an impedance of a reception attenuation band on a transmission filter side on a Smith chart.

A design concept of the conventional antenna duplexer 1100 described with reference to FIG. 19 is, for example, in the transmission frequency band, to "bring the impedance in the case in which the reception filter 1102 is viewed from the junction point 1106 close to infinity as much as possible", in other words, to "bring the phase θR2 of the impedance in the transmission attenuation band of the reception filter 1102 to 0 degrees". Concerning this design philosophy, in these circumstances, a fact described below has been found.

As long as a pass band of a transmission filter has a width, the phase θT1 of an impedance in the passband is different for each frequency. Thus, even if a phase-shift circuit is designed such that the phase θR2 of an impedance at a certain frequency is 0 degrees, a transmission loss is not always minimized in all the frequencies in the pass band. In that point, it could have been proven that the conventional design method can realize minimization of a signal loss only at specific frequencies.

In addition, in these circumstances, the inventor considered that, in design of an antenna duplexer, it was necessary to take into account the phase θT1 of the impedance in the pass band of the transmission filter as well rather than directing attention only to the phase θR2 of the impedance in the transmission attenuation band of the reception filer as in the conventional examples.

Next, the above evaluation contents (2) will be described with reference to FIGS. 4 and 5.

Figure 4:
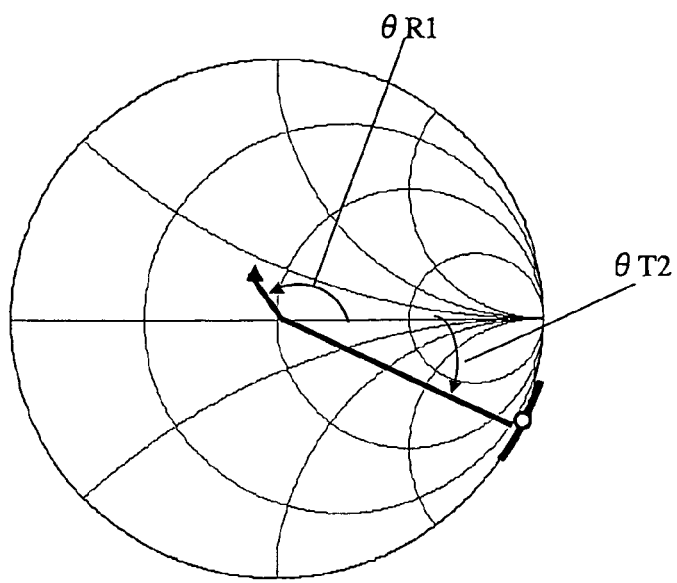
FIG. 4 is a diagram for explaining a phase $\theta R1$ of a pass band of the reception filter and a phase $\theta R2$ of a reception attenuation band on the transmission filter side in the first embodiment.

FIG. 4 is a diagram for explaining the phase θR1 of the impedance in the pass band of the reception filter 1102 at the time when the reception filter 1102 side is viewed from the junction point 1106 and the phase θR2 of the impedance in the reception attenuation band at the time when the transmission filter 1101 side is viewed from the junction point 1106.

FIGS. 5(a) to 5(h) are diagrams showing a relation between these respective phases and a signal loss. For example, FIG. 5(a) shows how a signal loss changes in the case in which the phase θR2 is changed in a state in which the phase θR1 is fixed to 0 degrees. Similarly, FIGS. 5(b) to (h) show how a signal loss changes in the case in which the phase θR1 is fixed to 45 degrees, 90 degrees, 135 degrees, 180 degrees, −45 degrees, −90 degrees, and −135 degrees.

Here, the above-described respective fixed values of the phase θR1 are values which are obtained in association with predetermined frequencies in the pass band of the reception filter 1102. In addition, the phase θR2 was changed mainly by adjusting a length of the strip line 103L or the like.

It is seen that, in the case in which the phase θR1 is set to 0 degrees or 180 degrees as shown in FIGS. 5(a) and 5(e), the signal loss is minimized (in FIG. 5(a), about 1.8 dB) when the phase θR2 is 0 degrees. On the other hand, it is seen that, for example, in the case in which the phase θR1 is fixed to −90 degrees as shown in FIG. 5(g), the signal loss is minimized (about 1.70 dB) when the phase θR2 is about 25 degrees.

Judging from the above, as in the case of FIG. 3, the signal loss is not always minimized in all the frequencies of the pass band of the reception filter 1102 when the phase θR2 of the impedance in the reception attenuation band of the transmission filter 1101 is 0 degrees.

In these circumstances, as in the case of FIG. 3, as long as a pass band of a reception filter has a width, the phase θR1 of an impedance in the pass band is different for each frequency. Thus, even if a phase-shift circuit is designed such that the phase θR2 of an impedance at a certain frequency becomes 0 degrees, a transmission loss is not always minimized in all the frequencies in the pass band. In that point, it could have been proven that the conventional design method is not a suitable design method.

In addition, in these circumstance, the inventor considered that, in design of an antenna duplexer, it was necessary to take into account the phase θR1 of the impedance in the pass band of the reception filter as well rather than directing attention only to the phase θR2 of the impedance in the reception attenuation band of the transmission filer as in the conventional examples.

(B) Next, grounds for deriving the design method for the antenna duplexer of the present invention will be described specifically with reference to the drawings.

FIG. 6 is a diagram showing the respective phases shown in FIGS. 2 and 4 on one Smith chart. Values of respective phases shown in FIG. 6 are positive in the counterclockwise direction and negative in the clockwise direction on the Smith chart.

Note that the definition of the phase different θ1 and the phase difference θ2 is as described at the beginning of the description of the preferred embodiments. This is represented as an expression as shown below.

$$\theta 1 = |\theta T1 - \theta R2| \qquad \text{[Expression 1]}$$

$$\theta 2 = |\theta R1 - \theta T2| \qquad \text{[Expression 2]}$$

FIG. 7 is an explanatory diagram for explaining grounds of the design method for the antenna duplexer of the present invention. Here, in order to obtain FIG. 7, for the sake of convenience, the description will be made using the antenna duplexer 100 shown in FIG. 1.

FIG. 7 is a diagram showing values of respective phases and signal losses in the case in which the phase θR2 was sequentially changed from 60 degrees to −80 degrees by adjusting the phase-shift circuit 104 of FIG. 1 and, at the same time, the phase θR2 was changed from −60 degrees to 80 degrees by adjusting the phase circuit 103.

More specifically, in respective columns of θT1 and θR1 of FIG. 7, (1) values of the phase θT$_1$ (in the figure, θT$_{1,1}$ to θT$_{1,13}$) and values of the phase θR$_1$ (in the figure, θR$_{1,1}$ to $\theta R_{1,13}$) at predetermined frequencies of the pass bands of the respective filters 1101 and 1102 are shown. In addition, in respective columns of a transmission loss and a reception loss of the figure, (2) values of signal losses in the transmission filter 1101 (in the figure, $LT_1$ to $LT_{13}$) and values of signal losses in the reception filter 1102 (in the figure, $LR_1$ to $LR_{13}$) are shown.

In addition, as shown in FIG. 7, the strip lines 103L and 104L (see FIG. 1) were adjusted for every change of the respective phases such that, with a central row 701 as a reference, in rows shown above the central row 701, the phase $\theta R2$ sequentially changed in the clockwise direction in FIG. 6 and, simultaneously with this, the phase $\theta R2$ sequentially changed in the counterclockwise direction. Further, the adjustment was performed such that phase angles indicated as the phases $\theta R2$ and $\theta R2$ were symmetrical in the vertical direction with respect to the real axis on the Smith chart. In the same manner, the respective phase-shift circuits 103 and 104 were adjusted such that, with the central row 701 as a reference, in rows below the central row 701, the phase $\theta T2$ sequentially changed in the counterclockwise direction and, simultaneously with this, the phase $\theta R2$ changed in the clockwise direction.

Moreover, FIG. 7 shows a case in which a frequency $f_T$ of a transmission signal, which is to be inputted to the transmission filter 1101 in an 800 MHz band, is fixed to 949 MHz, and a frequency $f_R$ of a reception signal, which is inputted to the reception filter 1102, is fixed to 819 MHz.

Note that, in the figure, since setting change of the phase $\theta R2$ is performed by adjusting a phase of the phase-shift circuit 103, the setting change naturally affects the values of the phase $\theta T1$ of the pass band of the transmission filter 1101. In addition, due to the same reason, setting change of the phase $\theta R2$ also affects the values of the phase $\theta R1$.

As an example, contents of a description of the central row 701 of FIG. 7 will be explained.

In the figure, the central row 701 shows a case in which the phase-shift circuit 103 is adjusted such that the phase $\theta R2$ becomes 0 degrees, and the phase-shift circuit 104 is adjusted such that the phase $\theta R2$ becomes 0 degrees. In this case, a transmission loss in the transmission filter 1101 was $Lt_6=1.16$ dB, and a reception loss in the reception filter 1102 was $LR_6=1.70$ dB. In addition, in this case, a phase of the pass band of the transmission filter 1101 was $\theta T_{1,6}=60.8$ degrees, and a phase of the pass band of the reception filter 1102 was $\theta R_{1,6}=-112.8$ degrees.

Therefore, the phase differences $\theta1$ and $\theta2$ in this case can be found from expressions 1 and 2 as shown below using the values of the respective phases corresponding to the respective columns of the central row 701.

$\theta1_6=|\theta T_{1,6}-0|=|60.8-0|=60.8$ (degrees)  [Expression 3]

$\theta2_6=|\theta R_{1,6}-0|=|-112.8-0|=112.8$ (degrees)  [Expression 4]

FIGS. 9(a) and 9(b) are diagrams showing a relation between the phase differences $\theta1$ and $\theta2$, which have been calculated as described above from the respective phases shown in FIG. 7 on the basis of the relation indicated by expressions 1 and 2, and the signal losses shown in FIG. 7.

More specifically, FIG. 9(a) is a diagram showing characteristics of a change in the transmission loss 702 shown in FIG. 7 (values corresponding to $LT_3$ to $LT_{13}$ in the figure) with the phase difference $\theta1$ as a reference. FIG. 9(b) is a diagram showing the reception loss 703 shown in FIG. 7 (values corresponding to $LR_1$ to $LR_{12}$ in the figure) with the phase difference $\theta2$ as a reference. Note that, in FIG. 9(a), a point, which is determined by the phase difference $\theta1_6$ found by expression 3 and the transmission loss $LT_6$ at that point, is indicated as A ($\theta1_6$, $LT_6$). In addition, in FIG. 9(b), a point, which is determined by the phase difference $\theta2_6$ found by expression 4 and the reception loss $LR_6$ at that point, is indicated as B ($\theta2_6$, $LR_6$).

Here, the transmission loss 702 means a signal loss of a transmission filter, and the reception loss 703 means a signal loss of a reception filter. In addition, in the figure, for comparison, values of a transmission loss (1.16 dB) and a reception loss (1.70 dB), which are attained in the case in which the conventional design method is used, are indicated by a dashed line.

It is seen from FIG. 9(a) that a value of the phase difference $\theta1$, at which the transmission loss 702 is minimized, is about 147 degrees. The transmission loss 702 at that point is about 1 dB. In addition, referring back to FIG. 7, it is seen that the phase $\theta T1$ and the phase $\theta R2$ at that point are in the vicinity of $\theta T_{1,10}$ degrees (denoted by reference numeral 706 in the figure) and −40 degrees (denoted by reference numeral 707 in the figure), respectively.

Therefore, concerning minimization of the transmission loss 702 of the antenna duplexer 100 of FIG. 1, in the case in which the frequency $f_T$ of a transmission signal to be inputted to the transmission filter 1101 is fixed to 949 MHz, and the frequency $f_R$ of a reception signal to be inputted to the reception filter 1102 is fixed to 819 MHz, the minimization can be attained as described below.

In short, it is sufficient to design the phase-shift circuits 103 and 104 such that the phase difference $\theta1$ becomes about 147 degrees. More specifically, length, width, and thickness of the strip lines 103L and 104L of the phase-shift circuits 103 and 104 are determined such that the phase $\theta T2$ corresponding to the phase $\theta T_{1,10}$ degrees (denoted by reference numeral 706 in FIG. 7) is in the vicinity of 40 degrees (denoted by reference numeral 708 in FIG. 7), and the phase $\theta R2$ is in the vicinity of −40 degrees, whereby the transmission loss 702 of the transmission filter 1101 can be minimized.

A minimum value of the transmission loss 702 in this case is about 1.0 dB. A signal loss is reduced more compared with the case in which both the phase $\theta R2$ and the phase $\theta R2$ described with reference to FIG. 7 are set to 0 degrees (see a row denoted by reference numeral 701 in the figure), that is, compared with the transmission loss (1.16 dB) obtained in the case in which the conventional design method described with reference to FIG. 19 is applied.

Moreover, according to FIG. 9(a), it is seen that, if the phase-shift circuits 103 and 104 are adjusted such that the phase difference $\theta1$ falls into a range below a dashed line, that is, a range of 60 degrees to 195 degrees, a signal loss can be reduced to a level equal to or lower than the minimum level of the signal loss according to the conventional design method.

On the other hand, it is seen from FIG. 9(b) that a value of the phase difference $\theta2$, at which the reception loss 703 is minimized, is about 150 degrees, and the reception loss 703 at that point is about 1.67 dB (denoted by reference numeral 710 in FIG. 7). In addition, referring back to FIG. 7, it is seen that the phases $\theta R2$ and $\theta R1$ at that point are in the vicinity of 20 degrees (denoted by reference numeral 711 in the figure) and $\theta R_{1,8}$ degrees (denoted by reference numeral 712 in the figure), respectively.

Therefore, concerning minimization of the reception loss 703 of the antenna duplexer 100 of FIG. 1, in the same manner as described above, in the case in which the frequencies $f_T$ and $f_R$ are fixed to 949 MHz and 819 MHz, respectively, it is sufficient to design the phase-shift circuits 103 and 104 such that the phase difference θ2 becomes about 150 degrees.

More specifically, length, width, and thickness of the strip lines 103L and 104L of the phase-shift circuits 103 and 104 are determined such that the phase θR2 is in the vicinity of 20 degrees (denoted by reference numeral 711 in FIG. 7), and the phase θR2 corresponding to the phase θR$_{1,8}$ degrees (denoted by reference numeral 712 in FIG. 7) is in the vicinity of −20 degrees (denoted by reference numeral 713 in the figure) whereby the reception loss 703 of the reception filter 1102 can be minimized.

A minimum value of the reception loss 703 in this case is about 1.67 dB. A signal loss is reduced more compared with the case in which both the phase θR2 and the phase θR2 described with reference to FIG. 7 are set to 0 degrees (see a row denoted by reference numeral 701 in the figure), that is, compared with the reception loss (1.70 dB) obtained in the case in which the conventional design method described with reference to FIG. 19 is applied.

Figure 9:
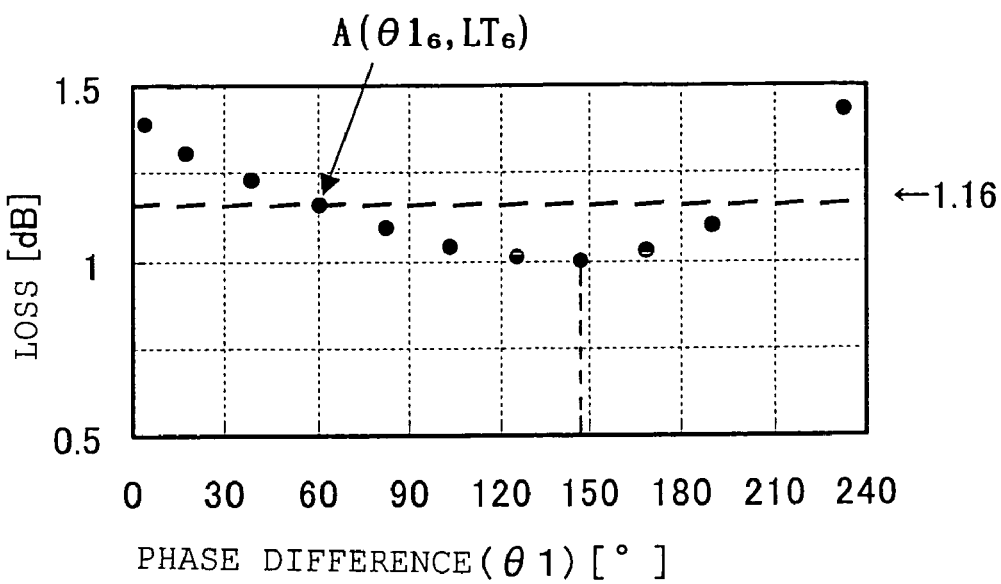
FIG. 9(a) is a diagram showing a relation between the transmission loss shown in FIG. 7 and a phase difference $\theta 1$.
FIG. 9(b) is a diagram showing a relation between the reception loss shown in FIG. 7 and a phase difference $\theta 2$.
Figure 9:
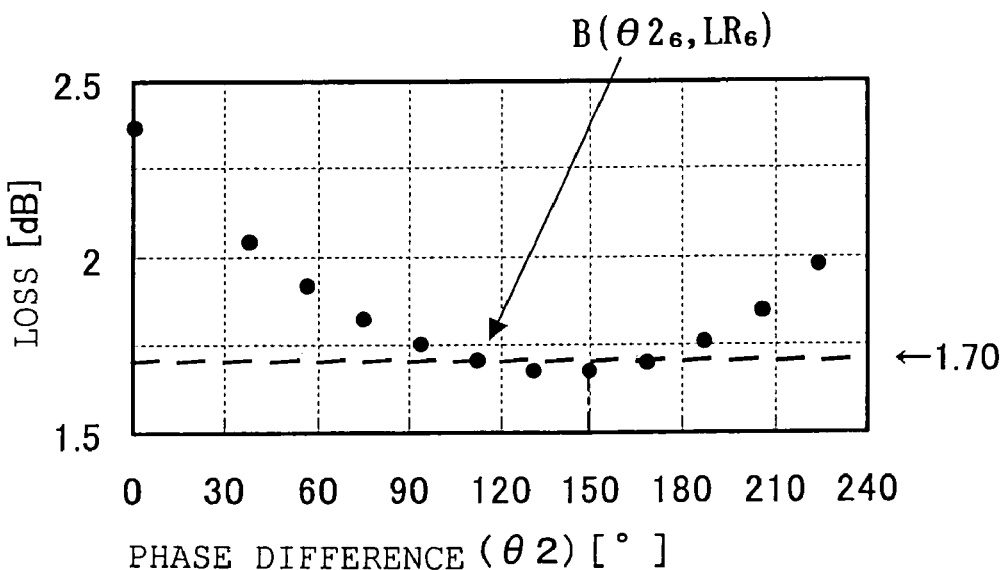

Moreover, according to FIG. 9(*b*), it is seen that, if the phase-shift circuits 103 and 104 are adjusted such that the phase difference θ2 falls into a range below a dashed line, that is, a range of 100 degrees to 170 degrees in the same manner as described above, a signal loss can be reduced to a level equal to or lower than the minimum level of the signal loss according to the conventional design method.

Note that, in the case in which a signal loss only has to be minimized if the frequencies $f_T$ and $f_R$ are 949 MHz and 819 MHz, respectively, in order to reduce both the transmission loss 702 and the reception loss 703 simultaneously, based upon the above description, it is sufficient to determine a circuit configuration of the phase-shift circuits 103 and 104 such that the phase θR2 becomes about 30 degrees and the phase θR2 becomes about −30 degrees (in this case, the phase difference θ1 is about 130 degrees and the phase difference θ2 is about 170 degrees). However, usually, it is desirable to minimize a signal loss with respect to all frequencies of a pass frequency band of a filter. This will be described later.

As described above, attention is directed to the phase differences θ1 and θ2, and a signal loss is evaluated with the phases differences as a reference, whereby it becomes possible to reduce the signal loss to a degree equal to or more than that in the conventional design method described with reference to FIG. 19.

Figure 20:
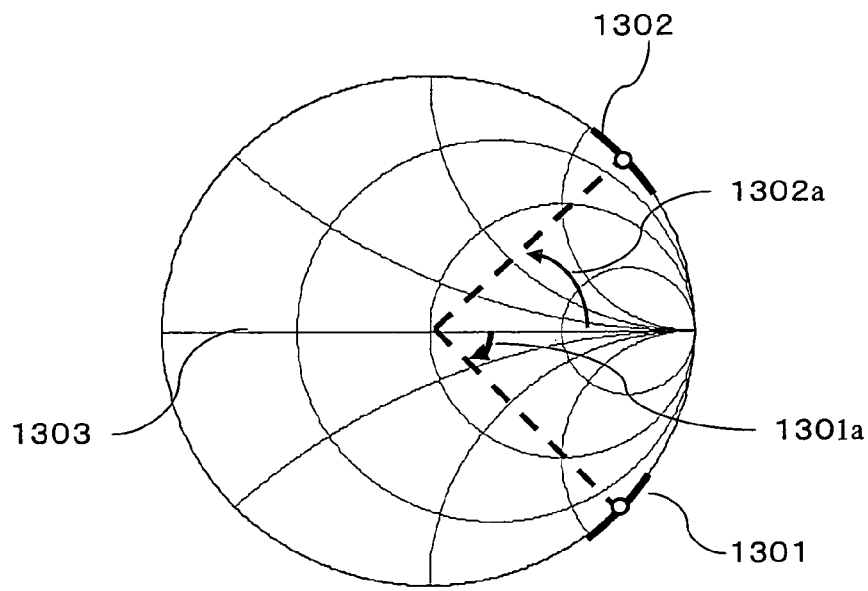
FIG. 20 is a diagram for explaining a conventional example in which it is attempted to realize appropriateness of impedance matching from a viewpoint different from the impedance matching of FIG. 19.

Here, as long as the above-described example in which the frequencies $f_T$ and $f_R$ are fixed to 949 MHz and 819 MHz, respectively is concerned, the example is the same as the conventional design method described with reference to FIG. 20 in terms of a result in that the circuit configuration of the phase-shift circuits 103 and 104 is determined such that the phase θR2 is in the vicinity of 30 degrees and the phase θR2 is in the vicinity of −30 degrees. Here, the conventional design method is a method of designing a phase-shift circuit such that a phase of an impedance in the transmission attenuation band of the reception filter 1102 at the time when the reception filter 1102 side is viewed from the junction point 1106 and a phase of an impedance of the reception attenuation band of the transmission filter 1101 at the time when the transmission filter 1101 side is viewed from the junction point 1106 are in a vertically symmetrical relation with the real axis 1303 of the Smith chart as a reference.

However, the design method described in this embodiment is completely different from the conventional design method described with reference to FIG. 20 in that, as described already, the concept of the phase differences θ1 and θ2 is introduced and a signal loss is evaluated on the basis of the concept.

Moreover, as described below, the design method in this embodiment has a characteristic in that the design method is applicable to all or a part of frequencies in a pass frequency band of a filter.

Moreover, the design method directing attention to phase differences also has a significant characteristic in that the design method can be applied to all filters in common regardless of a difference of pass frequency bands of the filters.

A case in which only a frequency of a signal to be inputted to a filter is changed will be hereinafter described with reference to FIGS. 8, 10(*a*), 10(*b*) and 11 using the structure of the antenna duplexer 100 of FIG. 1 as in the description with reference to FIG. 7.

FIG. 8 is a diagram, which corresponds to FIG. 7, in the case in which the frequency $f_T$ of a transmission signal to be inputted to the transmission filter 1101 is fixed to 940 MHz and the frequency $f_R$ of a reception signal to be inputted to the reception filter 1102 is fixed to 810 MHz.

In FIG. 8, for example, a row denoted by reference numeral 801 corresponds to the row denoted by reference numeral 701 in FIG. 7.

In addition, in FIG. 8, a structure of a phase-shift circuit specified by respective rows corresponding to FIG. 7 in terms of indication positions in the figure is the same as that in FIG. 7. In addition, in the case in which attention is directed to only FIG. 8, a circuit configuration of the antenna duplexer 100 corresponding to the respective rows is different for each row as in the case of FIG. 7.

More specifically, values of respective phases shown in FIG. 8 are values obtained by, after changing only the frequencies $f_T$ and $f_R$ of the pass band to the values as described above, using the phase-shift circuits 103 and 104 described with reference to FIG. 7. Therefore, for example, values of the respective phases of the central row 801 of FIG. 8 have a correspondence relation with the values of the respective phases of the central row 701 of FIG. 7 as described above. However, the values in FIG. 8 and the values in FIG. 7 are difference as specific values. For example, the phase θT2 and the phase θR2 of the central row 801 of FIG. 8, which correspond to the phase θT2=0 degrees and the phase θR2=0 degrees of the central row 701 of FIG. 7, are 10.6 degrees (denoted by reference numeral 804 in the figure) and 22.8 degrees (denoted by reference numeral 805 in the figure), respectively.

In addition, as in the case of FIG. 7, in the respective columns of θT1 and θR1 in FIG. 8, values of the phase θT1 (θ'T$_{1,1}$ to θ'T$_{1,13}$ in the figure) and values of the phase θR1 (θ'R$_{1,1}$ to θ'R$_{1,13}$ in the figure) are shown. Further, in the respective columns of the transmission loss and the reception loss of the figure, values of the transmission loss (L'T$_1$ to L'T$_{13}$ in the figure) and values of the reception loss (L'R$_1$ to L'R$_{13}$ in the figure) are shown.

Even if the circuit configuration in FIG. 8 is identical with the circuit configuration described with reference to FIG. 7, since frequencies of signals to be inputted to a filter are different, values of the respective phases are different. Therefore, different values are indicated for a signal loss as well.

Figure 10:
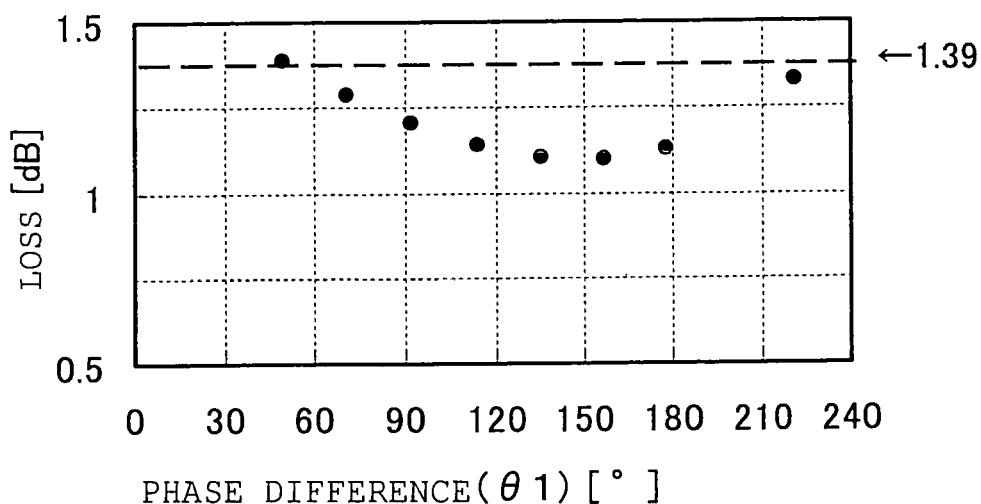
FIG. 10(a) is a diagram showing a relation between the transmission loss shown in FIG. 8 and the phase difference $\theta 1$.
FIG. 10(b) is a diagram showing a relation between the reception loss shown in FIG. 8 and the phase difference $\theta 2$.
Figure 10:
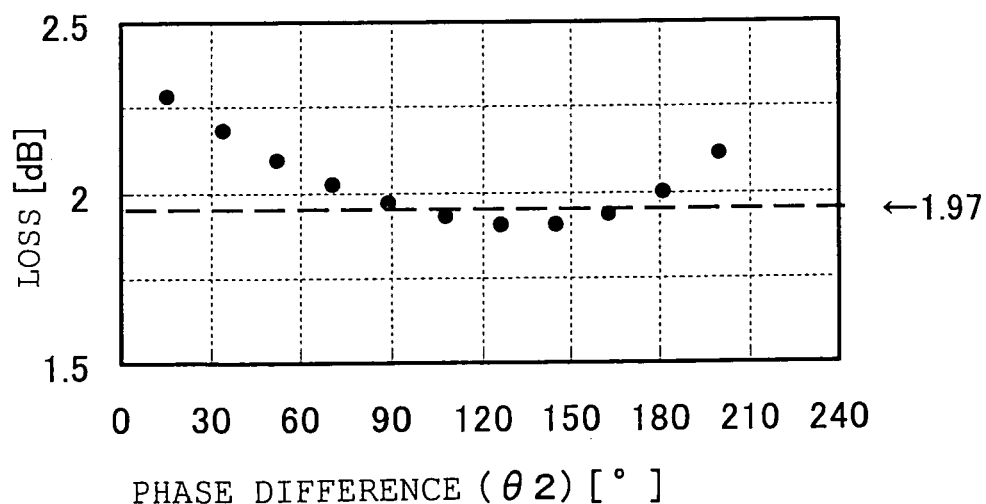

FIGS. 10(*a*) and 10(*b*) are diagrams showing a relation between the phase differences θ1 and θ2, which are calculated from the respective phases shown in FIG. 8 on the basis of the relations indicated by expressions 1 and 2, and the signal losses shown in FIG. 8.

A minimum value of the transmission loss 802 in this case (see FIG. 10(a)) is about 1.1 dB at the phase difference θ1 of about 157 degrees (which corresponds to the transmission loss L'T$_{11}$ denoted by reference numeral 806 in FIG. 8), and a minimum value of the reception loss 803 (see FIG. 10(b)) is about 1.9 dB at the phase difference θ2 of about 126 degrees (which corresponds to the reception loss L'R$_8$ denoted by reference numeral 807 in FIG. 8). Both the transmission loss 802 and the reception loss 803 are reduced more than the transmission loss of L'T$_6$=1.39 dB and the reception loss of L'R$_6$=1.97 dB shown in the central row 801 of FIG. 8 which are obtained by the conventional design method.

In addition, according to FIG. 10(a), it is seen that, if the phase-shift circuits 103 and 104 are adjusted such that the phase difference θ1 falls into an area below a dashed line, that is, in a range of 50 to 230 degrees, a transmission loss can be reduced to a level equal to or lower than the minimum level of the transmission loss according to the conventional design method.

Further, similarly, according to FIG. 10(b), it is seen that, if the phase-shift circuits 103 and 104 are adjusted such that the phase difference θ2 falls into an area below a dashed line, that is, a range of 100 to 170 degrees, a reception loss can be reduced to a level equal to or lower than the minimum level of the reception loss according to the conventional design method.

Therefore, concerning minimization of the transmission loss 802 of the antenna duplexer 100 of FIG. 1, the minimization can be attained as described below.

That is, in the same manner as described above, in the case in which the frequencies f$_T$ and f$_R$ are fixed to 940 MHz and 810 MHz, respectively, it is sufficient to constitute the phase-shift circuits 103 and 104 such that the phase θT2 corresponding to θ'T$_{1,11}$ degrees (denoted by reference numeral 808 in FIG. 8) is in the vicinity of 60 degrees (denoted by reference numeral 809 in the figure), and the phase θR2 is in the vicinity of −27 degrees (denoted by reference numeral 810 in the figure).

On the other hand, concerning minimization of the reception loss 803, in the same manner as described above, it is sufficient to constitute the phase-shift circuits 103 and 104 such that the phase θR2 is in the vicinity of 30 degrees (denoted by reference numeral 811 in FIG. 8) and the phase θR2 is in the vicinity of 3 degrees (denoted by reference numeral 812 in the figure).

From the above description, it is seen that, concerning the transmission loss 802 and the reception loss 803 described with reference to FIG. 8, minimum values are obtained in the case in which a relation between the phase θR2 and the phase θR2 are not the vertically symmetrical relation with the real axis of the Smith chart shown in FIG. 6 as a reference. In this way, the design method of the present invention shows effects which cannot be obtained by the conventional design method described with reference to FIG. 20.

Figure 11:
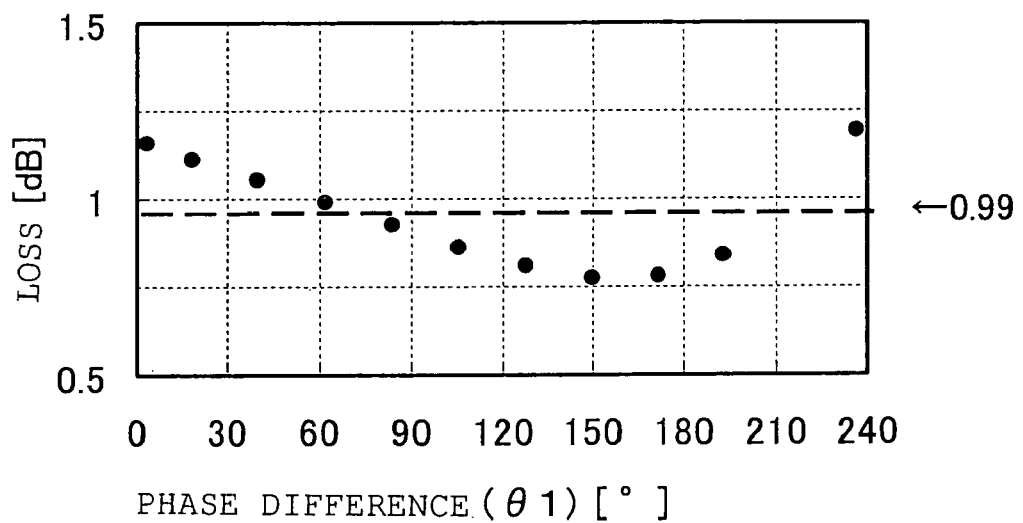
FIG. 11 is a diagram showing a relation between the transmission loss shown in FIG. 9 and the phase difference $\theta 1$.

FIG. 11 is a diagram showing a relation between a transmission loss and the phase difference θ1 in the case in which the frequency f$_T$ of a transmission signal to be inputted to the transmission filter 1101 is fixed to 958 MHz and the frequency f$_R$ of a reception signal to be inputted to the reception filter 1102 is fixed to 828 MHz.

According to FIG. 11, it is seen that, if the phase-shift circuits 103 and 104 are adjusted such that the phase difference θ1 falls into an area below a dashed line, that is, a range of 60 to 220 degrees, the transmission loss can be reduced to a level equal to or lower than the minimum level of the signal loss according to the conventional design method. In addition, according to the figure, a minimum value of the transmission loss 902 is about 0.78 dB at the phase difference θ1 of about 150 degrees.

In these circumstances, a design rule used for the design of the phase-shift circuits 103 and 104 shown in FIG. 1 in the case in which all pass bands are taken into account will be described.

First, a design rule concerning reduction of a transmission loss of a transmission filter, for which a pass band is 940 MHz to 958 MHz, can be derived as described below by directing attention to a common range of an allowable range of the phase difference θ1 indicated for respective frequencies of the center (see FIG. 9(a)), the lower limit (see FIG. 10(a)), and the upper limit (see FIG. 11) of the pass band.

In other words, the antenna duplexer 100, which can reduce a transmission loss in all the frequencies of the pass band to a value equal to or lower than the conventional value, can be provided by designing the phase-shift circuits 103 and 104 such that the phase difference θ1 falls into a range of 60 to 195 degrees.

On the other hand, a design rule concerning reduction of a reception loss of a reception filter can be derived as 100 to 170 degrees by directing attention to a common range of an allowable range of the phase difference θ2 indicated for the respective frequencies in the same manner as described above.

Therefore, the antenna duplexer 100, which can reduce a reception loss in all the frequencies of the pass band to a value equal to or lower than the conventional value, can be provided by designing the phase-shift circuits 103 and 104 such that the phase difference θ2 falls into a range of 100 to 170 degrees.

(C) In these circumstance, the design method for the antenna duplexer of this embodiment can be summarized as described below.

That is, directing attention to the phase difference(s) θ1 and/or θ2, the phase-shift circuits 103 and 104 are designed such that the phase difference(s) θ1 and/or θ2 is included in a predetermined range. Here, the definition of the phase differences θ1 and θ2 is as described above.

More specifically, in the case in which a filter of 800 MHz band is used as described above, directing attention to both the phase differences, the phase-shift circuits 103 and 104 are designed such that the phase differences θ1 and θ2 fall into a range of 100 degrees or more and 170 degrees or less.

In addition, more preferably, the phase-shift circuits 103 and 104 are designed such that the phase differences θ1 and θ2 fall into a range of 120 degrees or more and 150 degrees or less.

The antenna duplexer 100 designed in this way shows an effect that a signal loss can be reduced more with respect to all frequencies of a pass band of the filter of the 800 MHz band compared with the conventional antenna duplexer.

(D) Next, it will be verified that this design method described above, which directs attention to phase differences, can also be applied to design of an antenna duplexer using a filter of a 1.5 GHz band.

Figure 12:
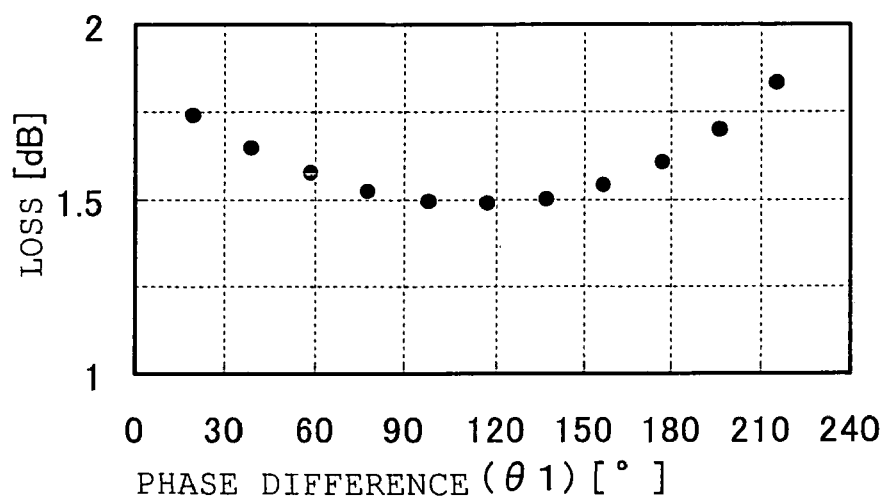
FIG. 12(a) is a diagram showing a relation between a transmission loss of the transmission filter at 1441 MHz and the phase difference $\theta 1$.
FIG. 12(b) is a diagram showing a relation between a reception loss of the reception filter at 1489 MHz and the phase difference $\theta 2$.
Figure 12:
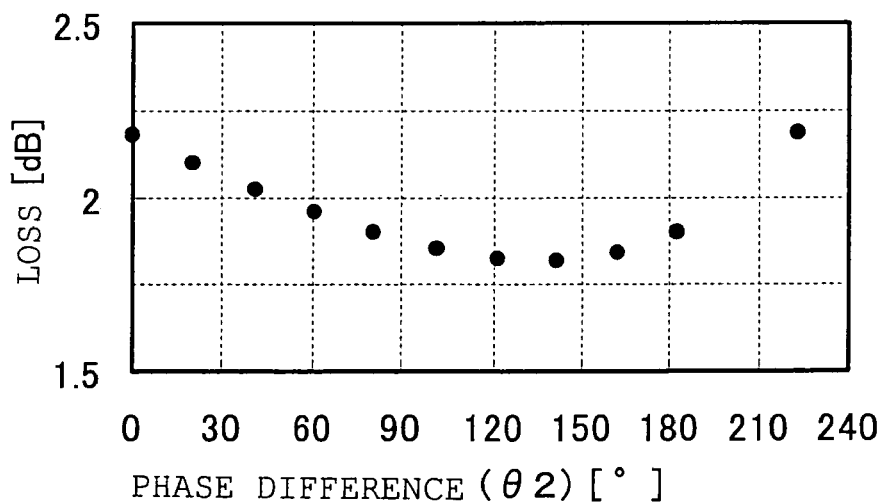
Figure 13:
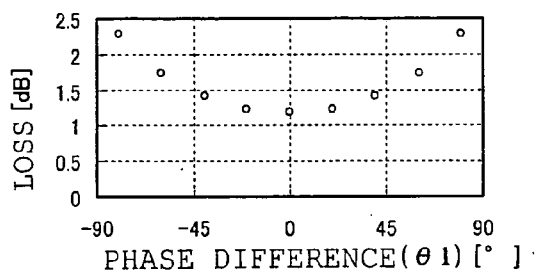
Figure 13:
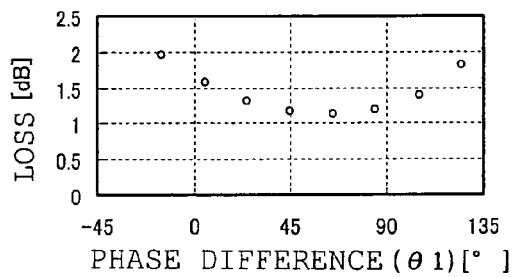
Figure 13:
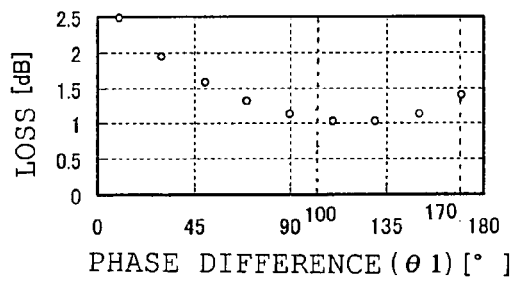
Figure 13:
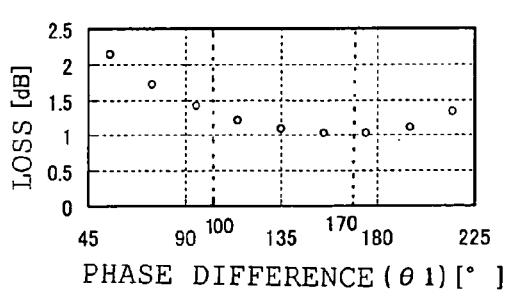
Figure 13:
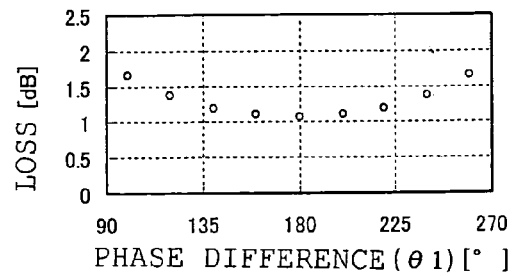
Figure 13:
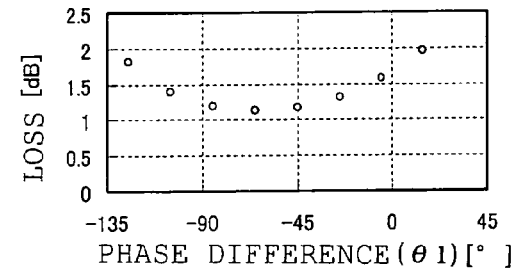
Figure 13:
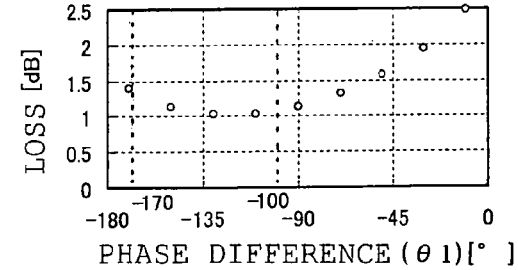
Figure 13:
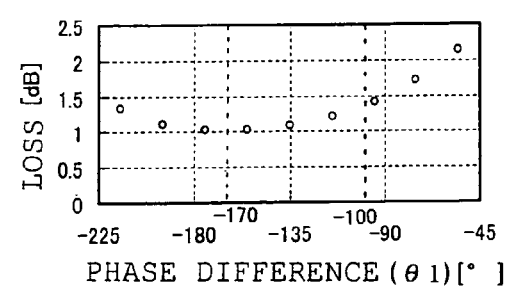

FIG. 12(a) is a diagram showing a relation between a transmission loss of a transmission filter at 1441 MHz and the phase difference θ1. FIG. 12(b) is a diagram showing a relation between a reception loss of a reception filter at 1489 MHz and the phase difference θ2.

As it is evident from these figures, it is seen that the respective signal losses are minimized at the time when the phase difference θ1 is about 120 degrees and the phase difference θ2 is about 150 degrees, and both the signal losses tend to be minimized around these values. Further, both values of the phase differences, at which these signal losses are minimized, are included in the range of the phase differences of the design rule applied to the filter of the 800 MHz band (100 to 170 degrees).

Therefore, it could have been verified that the design method, which directs attention to phase differences, is also applicable to the case of the 1.5 GHz band.

Note that the design rule for phase differences concerning the filter of the 800 MHz band described with reference to in FIGS. 7 to 11 is set to 100 degrees to 170 degrees. On the other hand, judging from the above description, the design rule for phase differences concerning the filter of the 1.5 GHz band can be set in the range of 120 to 150 degrees.

Therefore, in order to obtain an advantage that an identical design rule can be used regardless of a frequency band of a filter, it is sufficient to set a design rule of phase differences to a range of 120 degrees or more and 150 degrees or less.

(E) The description made above is about the method up to the derivation of a design rule, which directs attention to phase differences, on the basis of the phases $\theta T1$, $\theta R1$, and the like, which are determined in the case in which the phases $\theta R2$ and $\theta R2$ are changed every ±10 degrees or ±20 degrees on the Smith chart with, for example, the phases $\theta R2$ and $\theta R2$ shown in the central row 701 as a reference.

However, depending upon a value of the phase $\theta T1$, the range of the design rule of the phase differences cannot be applied. Thus, that point will be described.

FIGS. 13(a) to 13(h) are diagrams showing a relation between the phases and the transmission loss shown in FIGS. 3(a) to 3(h) with the horizontal axis replaced with the phase difference $\theta 1$ (i.e., $\theta T1-\theta R2$). Note that, here, for convenience of explanation, a value, for which an absolute value is not taken, is called a phase difference unlike the above-described definition. However, if an absolute value of this value is taken, the phase difference is the same concept as the phase difference of the above-described definition.

In these figures, those indicated by identical letters (e.g., FIG. 13(a) and FIG. 3(a)) correspond to each other.

For example, judging from a characteristic of a transmission loss shown in FIG. 13(a), a range of the phase difference $\theta 1$, in which the transmission loss can be reduced, is a fixed range around the time of 0 degrees. However, this fixed range is a range completely different from the design rule (100 to 170 degrees) in this design method described in above (C).

On the other hand, for example, in the cases shown in FIGS. 13(c), 13(d), 13(g) and 13(h), when the phase difference $\theta 1$ is in the vicinity of 135 degrees (or −135 degrees) in the design rule, the transmission loss is a lower value compared with a minimum value (about 1.2 dB) shown in FIG. 13(a).

In addition, in the case of FIG. 13(e), when the phase difference $\theta 1$ is in the vicinity of 180 degrees, the transmission loss is a lower value compared with the minimum value (about 1.2 dB) shown in FIG. 13(a). In other words, FIG. 13(e) means that, in the case in which, if the phase $\theta T1$ is in a position of 180 degrees, the other phase $\theta R2$ is always 0 degrees, that is, in an open state, the transmission loss indicates a minimum value. Concerning this point, when FIG. 13(e) is compared with FIG. 13(a), a value of the phase difference $\theta R2$ in an attenuation band is 0 degrees in both cases. However, it is indicated that the transmission loss can be reduced more when the phase $\theta T1$ of an impedance in a certain frequency in a pass band is 180 degrees (FIG. 13(e)) rather than 0 degrees (FIG. 13(a)).

In these circumstance, in order to realize a low loss in the antenna duplexer of the present invention for plural frequencies in a band by applying the design rule (100 to 170 degrees) described in above (C) without change, it is necessary that the phase $\theta T1$ is included in a range of 90 to 270 degrees. Here, $\theta T1=270$ (degrees) corresponds to $\theta T1=-90$ (degrees) of FIG. 13(g).

Note that, in the case in which $\theta T1$ is 180 degrees at a specific frequency of plural frequencies in a pass band, it is needless to mention that a standard of phase difference $\theta 1=0$ (degrees) may be adopted instead of the above-described design rule.

The same is true for the phase difference $\theta 2$ (i.e., $\theta R1 -\theta R2$). An allowable range of the phase $\theta R1$, to which the design rule (100 to 170 degrees) described in above (C) can be applied without change, is about 90 to 270 degrees.

In these circumstance, a filter has plural frequencies, that is, a bandwidth of a pass band. Therefore, in order to design an antenna duplexer such that a signal loss is reduced for all or a part of frequencies in a pass frequency band of a filter, when the phase $\theta T1$ of a pass band of a transmission filter is in a range of 90 to 270 degrees, it is sufficient to set the phase difference $\theta 1$ to be included in a range of 100 to 170 degrees, more preferably 120 to 150 degrees.

In addition, the same is true for the phase $\theta R1$ of a pass band of a reception filter. When the phase $\theta R1$ is in a range of 90 to 270 degrees, it is sufficient to set the phase difference $\theta 2$ to be included in a range of 100 to 170 degrees, more preferably 120 to 150 degrees.

Second Embodiment

Figure 16:
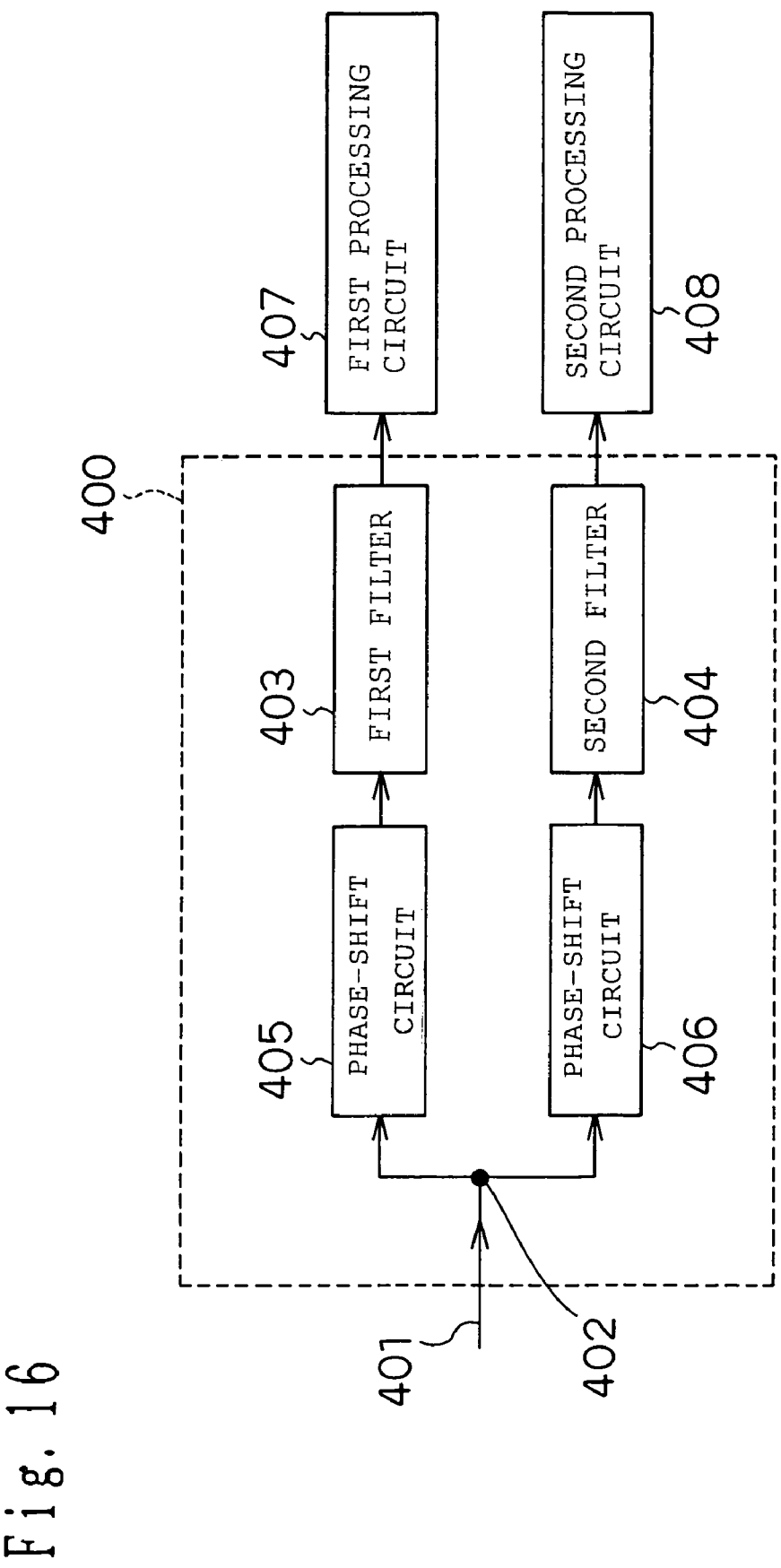
FIG. 16 is a block diagram of a diplexer in a second embodiment of the present invention.

FIG. 16 is a diagram showing a structure of an embodiment of a diplexer of the present invention. A structure of a diplexer 400 of this embodiment will be described with reference to the figure.

As shown in FIG. 16, the diplexer 400 of this embodiment includes: a branch point 402 of branching an input signal 401 to one side and the other side; a first filter 403 which passes a signal of a first pass band of the signal branched to one side; and a second filter 404 which passes a signal of a second pass band of the signal branched to the other side. In addition, the diplexer 400 includes: a phase-shift circuit 405 which is provided between the branch point 402 and the first filter 403 and adjusts a phase of the first filter 403; and a phase-shift circuit 406 which is provided between the branch point 402 and the second filter 404 and adjusts a phase of the second filter 404. Note that a first processing circuit 407 is a circuit of processing an output signal from the first filter 403, and a second processing circuit 408 is a circuit of processing an output signal from the second filter 404.

Here, a structure of the diplexer 400 of this embodiment is different from the structure of the antenna duplexer 100 shown in FIG. 1 in that a flow of a signal 401 of the diplexer 400 is limited to one direction. Structures of other components such as phase-shift circuits and filters are basically the same.

Note that phase-shift circuit means of the present invention corresponds to a phase-shift circuit 405 and a phase-shift circuit 406. In addition, branching means of the present invention corresponds to a branch point 402.

Next, an embodiment of a design method for the diplexer of the present invention will be described mainly on the phase-shift circuits 405 and 406 which are necessary for realizing the structure of the diplexer 400.

The phase-shift circuits 405 and 406 are designed such that (1) a phase difference $\theta 1$ which is an absolute value of a difference between a first phase (corresponding to the phase θT1) of an impedance at a predetermined frequency $f_T$ of a pass band of the first filter 403 at the time when the first filter 403 side is viewed from the branch point 402 and a second phase (corresponding to the phase θR2) of an impedance at the predetermined frequency $f_T$ of a transmission attenuation band at the time when the second filter 404 side is viewed from the branch point 402 (hereinafter simply referred to as phase difference θ1), and (2) a phase difference θ2 which is an absolute value of a difference between a third phase (corresponding to the phase θR1) of an impedance at a predetermined frequency $f_R$ of a pass band of the second filter 404 at the time when the second filter 404 side is viewed from the branch point 402 and a fourth face (corresponding to the phase θR2) of an impedance at the predetermined frequency $f_R$ of a reception attenuation band at the time when the first filter 403 side is viewed from the branch point 402 (hereinafter simply referred to as phase difference θ2) is 100 degrees or more and 170 degrees or less, more preferably included in a range of 120 to 150 degrees.

Grounds for using such a design method are the same as the contents described in the first embodiment. Thus, a description of the grounds will be omitted.

With a circuit configuration designed by the design method, due to the same reason as the first embodiment, the diplexer 400 realizes the effect that both signal losses of the first filter 403 and the second filter 404 can be reduced as in the above-described embodiment.

As described in the first embodiment, points of the design method of this embodiment are that: (1) attention is directed to the phase difference θ1 between the first phase and the second phase; and (2) attention is directed to the phase difference θ2 between the third phase and the fourth phase.

Then, the phase-shift circuits 405 and 406 are designed such that at least one of the phase differences θ1 and θ2 is 100 degrees or more and 170 degrees or less, more preferably falls in a range of 120 to 150 degrees, whereby a signal loss can be reduced by a degree equal to or more than a conventional design method with respect to all or a part of frequencies of a pass band of a filter.

Note that, as already described, this design method directing attention to a phase difference can be applied regardless of a difference of a pass frequency band of a filter.

In addition, the range of the design rule of the phase difference cannot be applied depending upon a value of the first phase. Since this point is as described in above (E) in the first embodiment, a description thereof will be omitted here.

Third Embodiment

Figure 17:
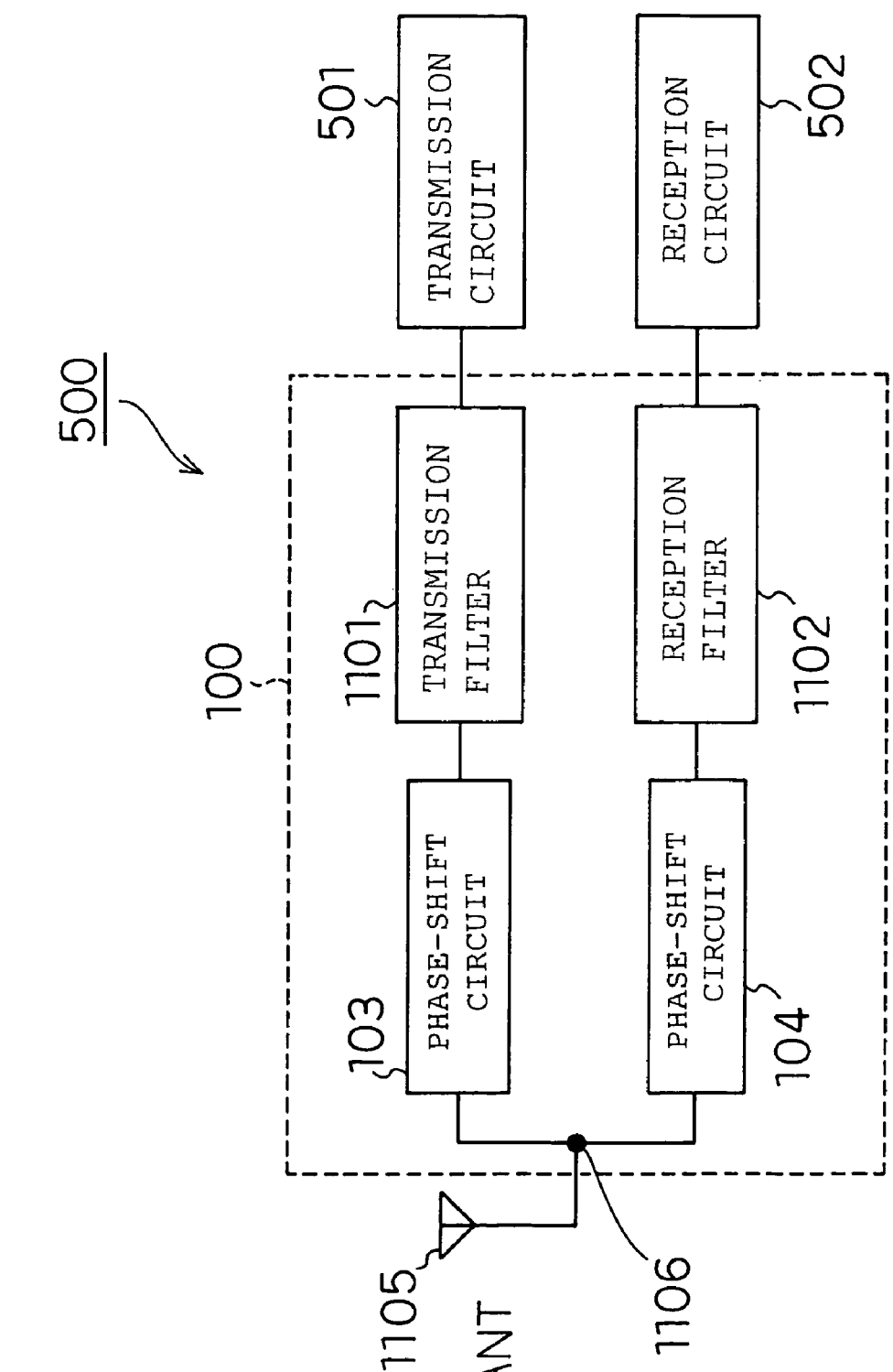
FIG. 17 is a block diagram of a communication apparatus in a third embodiment of the present invention.

FIG. 17 is a diagram showing a structure of an embodiment of a communication apparatus of the present invention. A structure of a communication apparatus 500 of this embodiment will be described with reference to the figure.

As shown in FIG. 17, the communication apparatus 500 of this embodiment has a structure of the antenna duplexer 100 (see FIG. 1) described in the first embodiment. In the figure, identical components are denoted by the same reference numerals and signs. Note that a transmission circuit 501 is a circuit of processing a transmission signal and outputting the signal to the transmission filter 1101. In addition, a reception circuit 502 is a circuit of processing the signal outputted from the reception filter 1102 and outputting the signal.

The contents described in the first embodiment can be applied to a design method for the antenna duplexer 100 of the communication apparatus 500 of this embodiment without change. Thus, a description thereof will be omitted here.

As it is evident from the above description, the communication apparatus 500 of this embodiment shows an effect that a signal loss can be reduced more compared with a conventional communication apparatus.

Note that, in the above-described embodiments, the case in which a phase-shift circuit is constituted by using a distributed constant element such as a strip line is described. The present invention is not limited to this, and the phase-shift circuit may be constituted using a lumped constant such as an inductor or a capacitor or may have other structures.

In addition, in the above-described embodiments, the case in which phase-shift circuits are provided on both a transmission filter side and a reception filter side, respectively, as phase-shift circuit means of the present invention is described. However, the present invention is not limited to this, and a phase-shift circuit may be provided in one of the side, or a structure in which no phase-shift circuit is provided on both the filter side as a result. In short, it is sufficient only if a relation of phases of an impedance at a predetermined frequency at the time when respective filter sides are viewed from a junction point or a branch point satisfies the design rule indicated in the above-described embodiment.

Therefore, even in the case in which the phase-shift circuit means of the present invention is, for example, one phase-shift circuit, which is constituted on one of a transmission filter side and a reception filter side or at a junction point (e.g., see a junction point 1106 of FIG. 14 to be described later), the phase-shift circuit can be set such that both the phase difference θ1 and the phase difference θ2 are included in the range of the design rule.

In addition, only one of the phase-shift circuits may be sufficient as described above. A reason for this is as described below. For example, in the case in which the phase-shift circuit 103 (see FIG. 1) on the transmission filter 1101 side is adjusted, it is as already described that the adjustment affects not only the phase θT1 (i.e., a phase of an impedance at a certain frequency of a pass band of a transmission filter at the time when a transmission filter side is viewed from a junction point) but also the phase θT2 (i.e., a phase of an impedance at a certain frequency of a reception attenuation band at the time when the transmission filter side is viewed from the junction point). On the other hand, the phase θR2 is an element of determining the phase difference θ2. Therefore, both the phase differences θ1 and θ2 may be included in the range of the design rule by adjusting only the phase-shift circuit 103. This point is entirely the same for the phase-shift circuit 104.

Further, in the above-described embodiments the embodiment of the design method for the antenna duplexer of the present invention is described centering on the design method for the phase-shift circuit which can reduce a signal loss as bands as a whole. However, the present invention is not limited to this. For example, in the case in which an antenna duplexer already exists, the design method for the antenna duplexer of the present invention can be applied as a method of evaluating whether or not appropriate design is made from a viewpoint of reduction of a signal loss.

Here, a further description will be made about a case in which the design method for the antenna duplexer of the present invention as the method of evaluation whether or not appropriate design is made from a viewpoint of reduction of a signal loss is applied to an antenna duplexer 200 (see FIG.

14) in which a phase-shift circuit 201, which is constituted with an inductor element 201L connected to the junction point 1106, already exists.

Figure 14:
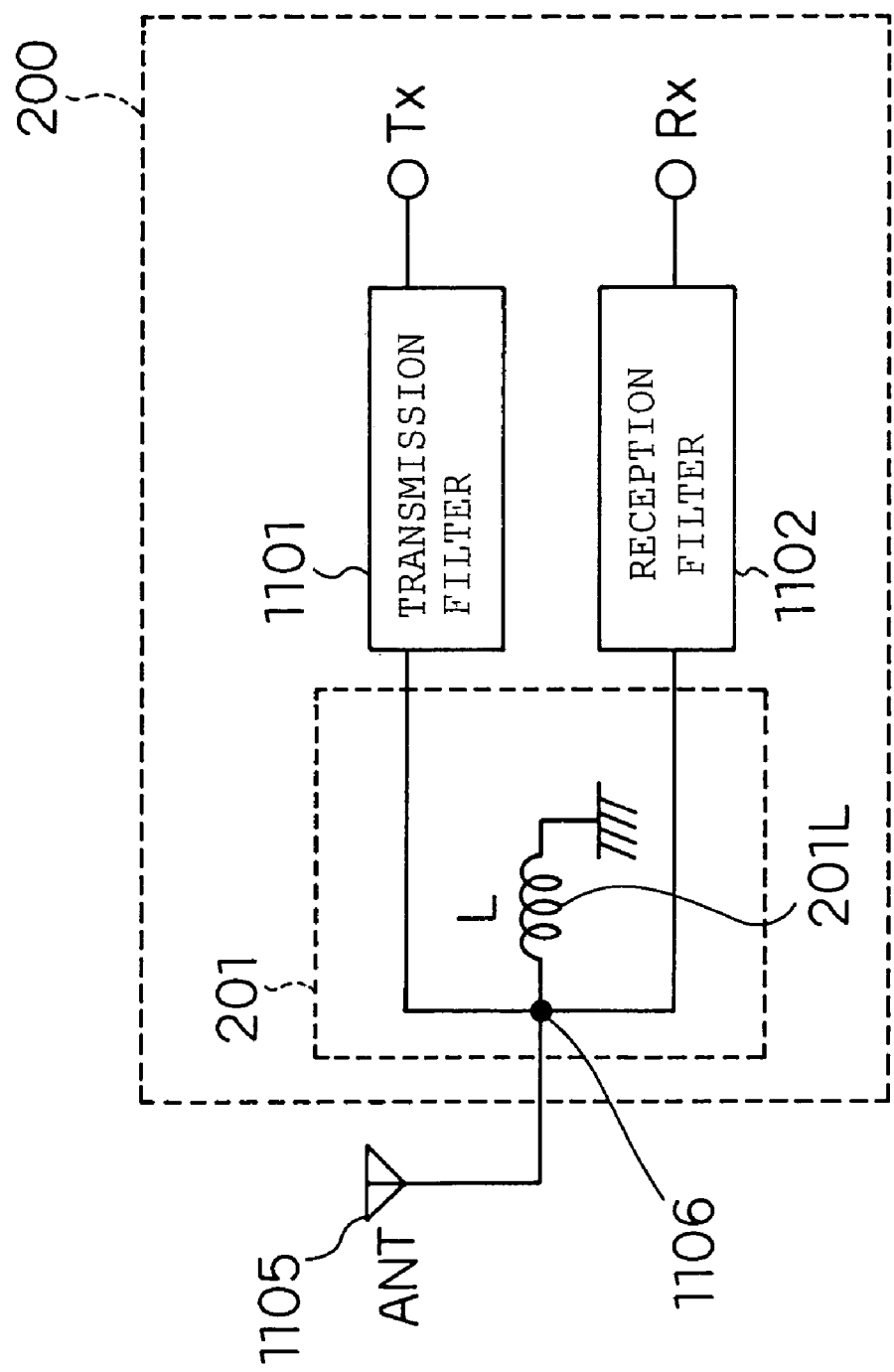
FIG. 14 is a block diagram showing a modification of the structure of the antenna duplexer of the present invention shown in FIG. 1.
Figure 15:
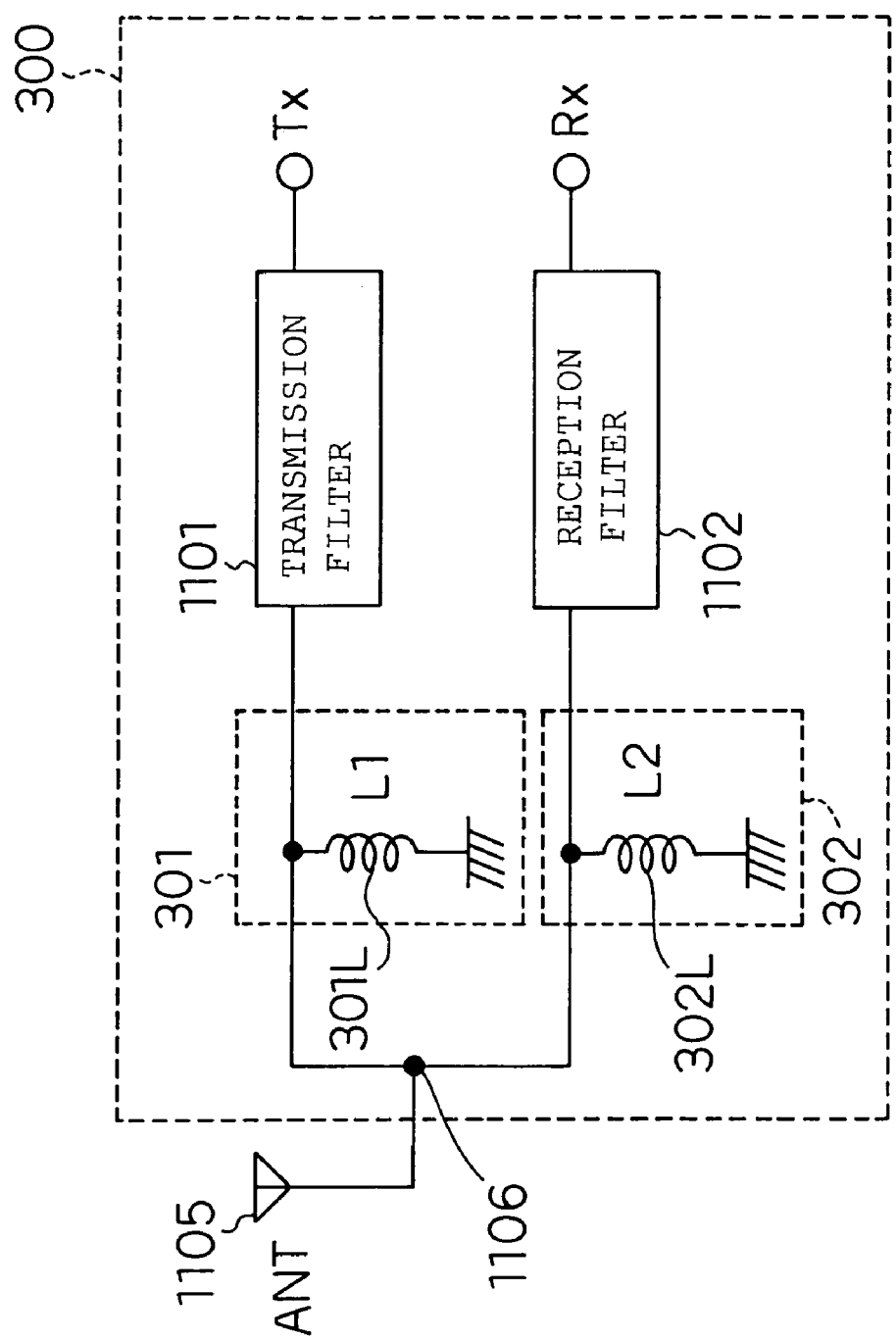
FIG. 15 is a block diagram of an equivalent circuit of the antenna duplexer shown in FIG. 14.

In this case, the inductor element 201L of FIG. 14 is replaced with equivalent circuits (301, 302) as shown in FIG. 15, whereby the design method for the antenna duplexer of the present invention can be applied on the basis of the phase-shift circuits 301 and 302 of FIG. 15. Consequently, an evaluation of the antenna duplexer 200 becomes possible. Note that, here, a relation between an inductance L of the inductor element 201L of FIG. 14 and an inductance L1 of an inductor element 301L and an inductance L2 of an inductor element 302L of FIG. 15 can be represented by the following expression.

$$1/L=1/L1+1/L2 \quad \text{[Expression 5]}$$

In addition, the design method for the antenna duplexer of the present invention can be applied also as a production method for the antenna duplexer. More specifically, the production method in this case is a production method for an antenna duplexer which includes: a transmission filter of receiving a transmission signal and passing a signal of a predetermined pass band; and a reception filter of receiving a reception signal obtained from an antenna and passing a signal of a predetermined pass band. The production method includes: a design step of designing the antenna duplexer such that (1) a relation between a first phase of an impedance at a predetermined frequency of the pass band of the transmission filter in the case in which the transmission filter side is viewed from an antenna terminal portion of connecting the antenna and a second phase of an impedance at the predetermined frequency in the case in which the reception filter side is viewed from the antenna terminal portion and/or (2) a relation between a third phase of an impedance at a predetermined frequency of the pass band of the reception filter in the case in which the reception filter side is viewed from the antenna terminal portion and a fourth phase of an impedance at the predetermined frequency in the case in which the transmission filter side is viewed from the antenna terminal portion satisfies a fixed rule; and an assembly step of performing assembling of the designed antenna duplexer. Moreover, in this case, the antenna duplexer may have a structure including phase-shift circuit means (3) which is provided between the antenna terminal portion and the transmission filter and is used for adjusting a phase of the transmission filter and/or (4) which is provided between the antenna terminal portion and the reception filter and is used for adjusting a phase of the reception filter. In the design step, the same design method as described in the embodiments is used, and after the circuit design for the antenna duplexer is completed once, on the basis of designs specifications of the circuit design, circuit assembly work or the like is performed in a production department according to a usual process. Consequently, an antenna duplexer with less signal loss can be produced.

Further, the design method for the diplexer of the present invention can be applied as a production method for the diplexer. More specifically, the production method in this case is a production method for a diplexer including: (1) branching means of branching an input signal to be inputted to one side and the other side; (2) a first filter of passing a signal of a first pass band of the signal branched to one side; and (3) a second filter of passing a signal of a second pass band of the signal branched to the other side. The production method includes: a design step of designing the diplexer such that (a) a relation between a first phase of an impedance at a predetermined frequency of the pass band of the first filter in the case in which the first filter side is viewed from the branching means and a second phase of an impedance at the predetermined frequency in the case in which the second filter side is viewed from the branching means and/or (b) a relation between a third phase of an impedance at a predetermined frequency of the pass band of the second filter in the case in which the second filter side is viewed from the branching means and a fourth phase of an impedance at the predetermined frequency in the case in which the first filter side is viewed from the branching means satisfies a fixed rule; and an assembly step of performing assembling of the designed diplexer. Moreover, in this case, the diplexer may include, phase-shift circuit means (1) which is provided between the branching means and the first filter and is used for adjusting a phase of the first filter and/or (2) which is provided between the branching means and the second filter and is used for adjusting a phase of the second filter.

Moreover, it is needless to mention that the modifications described about the antenna duplexer, the design method for the antenna duplexer, and the production method for the antenna duplexer are also applicable to modifications of the present invention concerning the diplexer.

Furthermore, in the above-described embodiments, the description is centered on the application of the design method of the present invention in the case in which the phase $\theta T1$ of a pass band of a transmission filter or the phase $\theta R1$ of a pass band of a reception filter is in a range of 90 to 270 degrees. On the other hand, in the case in which attention is directed to one of the transmission filter and the reception filter, since the pass band has a predetermined width, it is possible that the phase $\theta T1$ or $\theta R1$ is included in the range of 90 to 270 degrees in a range of certain frequencies in the band but is included in a range of 0 to 90 degrees or 270 to 360 degrees in the other frequencies in the band. In such a case, it is possible that the design method of the present invention directing attention to the phase difference is applied in the former range of frequencies, and a method is designed such that the phase $\theta R2$ of a transmission attenuation band or the phase $\theta R2$ of a reception attenuation band is brought close to 0 degrees (open state) in the latter range of frequencies. In this case, when a phase of a pass band of a filter is 90 to 270 degrees, the effects proper to the present invention are obtained, and when the phase is 0 to 90 degrees or 270 to 360 degrees, reduction of a signal loss can be realized at least to a level equal to the conventional design method.

Next, as a specific example of the structure of the transmission filters and the reception filters described in the embodiments, a type using a thin film resonator (FBAR) and a type using a surface acoustic wave device (SAW device) will be further described.

First of all, a case in which one or both of the transmission filter 1101 and the reception filter 1102 of the embodiments are filters using a thin film resonator 2001 formed on a predetermined substrate will be described with reference to FIGS. 22 and 23.

Figure 22:
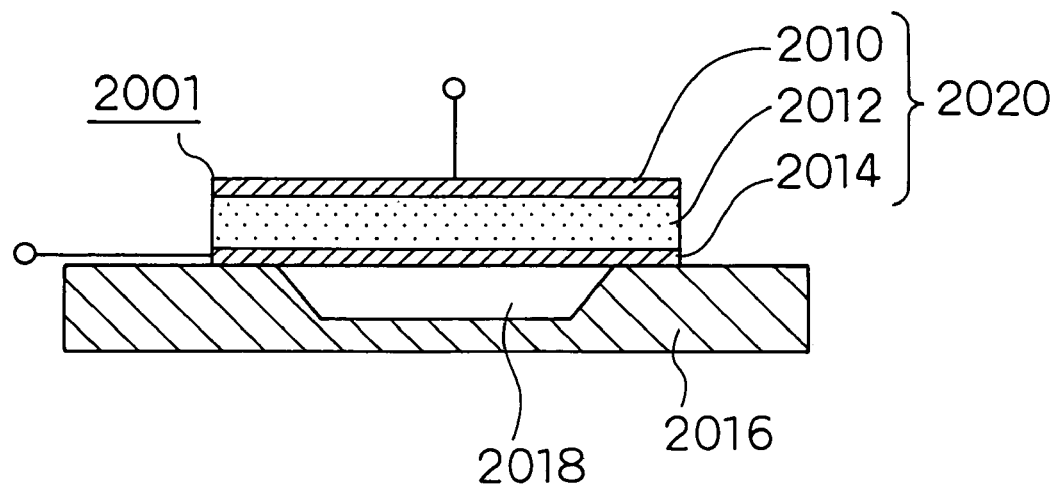
FIG. 22 is a schematic sectional view for explaining a structure of a thin film resonator.
Figure 23:
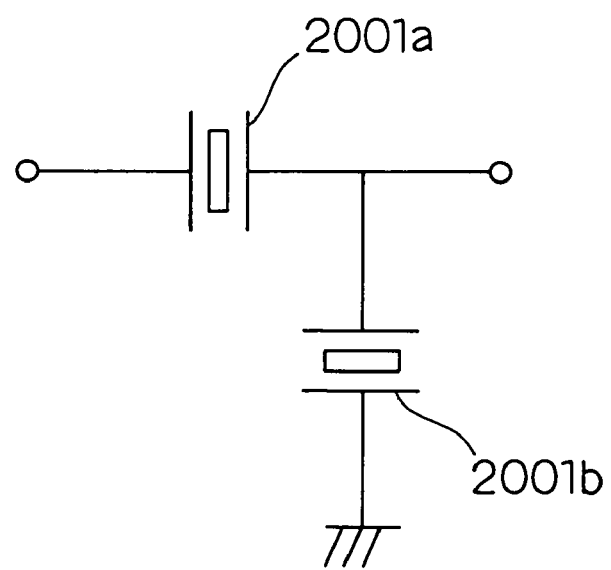
FIG. 23 is an electric circuit diagram of a ladder type filter.

FIG. 22 is a schematic sectional view for explaining a structure of the thin film resonator 2001.

As shown in FIG. 22, the thin film resonator 2001 includes: a resonating portion 2020 including an upper electrode 2010, a piezoelectric layer 2012, and a lower electrode 2014; a substrate 2016 provided with the resonating portion 2020; and a cavity 2018 which is formed below the lower electrode 2014 and in a substrate 2016.

As a filter structure using the thin film resonator 2001 constituted as described above, there are the following two types.

A first type is a filter which includes the constitution of connecting plural thin film resonators 2001a and 2001b each other in a ladder type (see FIG. 23) or combination of serial and/or parallel connection on the identical substrate 2016. Here, FIG. 23 is an electric circuit diagram of a ladder type filter. In addition, the filter may be a filter using one resonator as a serial-type resonator or parallel-type resonator.

A second type is a filter in which plural thin film resonators are arranged in proximity to each other and mode-coupling of the thin film resonators is utilized.

Since the thin film resonator 2001 has a high Q value, an antenna duplexer with higher performance can be realized by constituting the reception or transmission filter 1101 or 1102 in this way. More specifically, the antenna duplexer shows effects that a signal loss is reduced, and a steep attenuation characteristic can be realized.

Note that the cavity 2018 has a role of confining energy generated by the resonating portion. However, the cavity 2018 is not limited to this constitution, and any constitution may be adopted as long as the thin film resonator 2001 becomes a reflection element such as an acoustic mirror.

In addition, a passivation layer, a support layer, and the like may be added above the upper electrode 2010 or below the lower electrode 2014 as long as the thin film resonator 2001 operates as a bulk wave resonator.

Further, a shape (including a film thickness), a number, and the like of the resonating portion 2020 are designed optimally according to a filter characteristic to be requested. In addition, materials for the piezoelectric layer 2012, the upper electrode 2010, and the lower electrode 2014 are designed optimally according to a filter characteristic to be requested.

Moreover, it is preferable that a semiconductor substrate such as Si or GaAs is used as the substrate 2016. In this case, a semiconductor device (not shown) is created in the substrate 2016 and connected to a filter using a thin film resonator, whereby combination with a semiconductor device becomes possible.

Furthermore, in the case of using an acoustic mirror, part of mirror layers as a metal layer can be used for connection with a semiconductor device, an inductor, or a capacitor.

Next, a case in which the transmission filter 1101 or the reception filter 1102 of the embodiments is a surface acoustic wave filter including an IDT electrode formed on a piezoelectric substrate will be described with reference to FIGS. 24 and 25.

Figure 24:
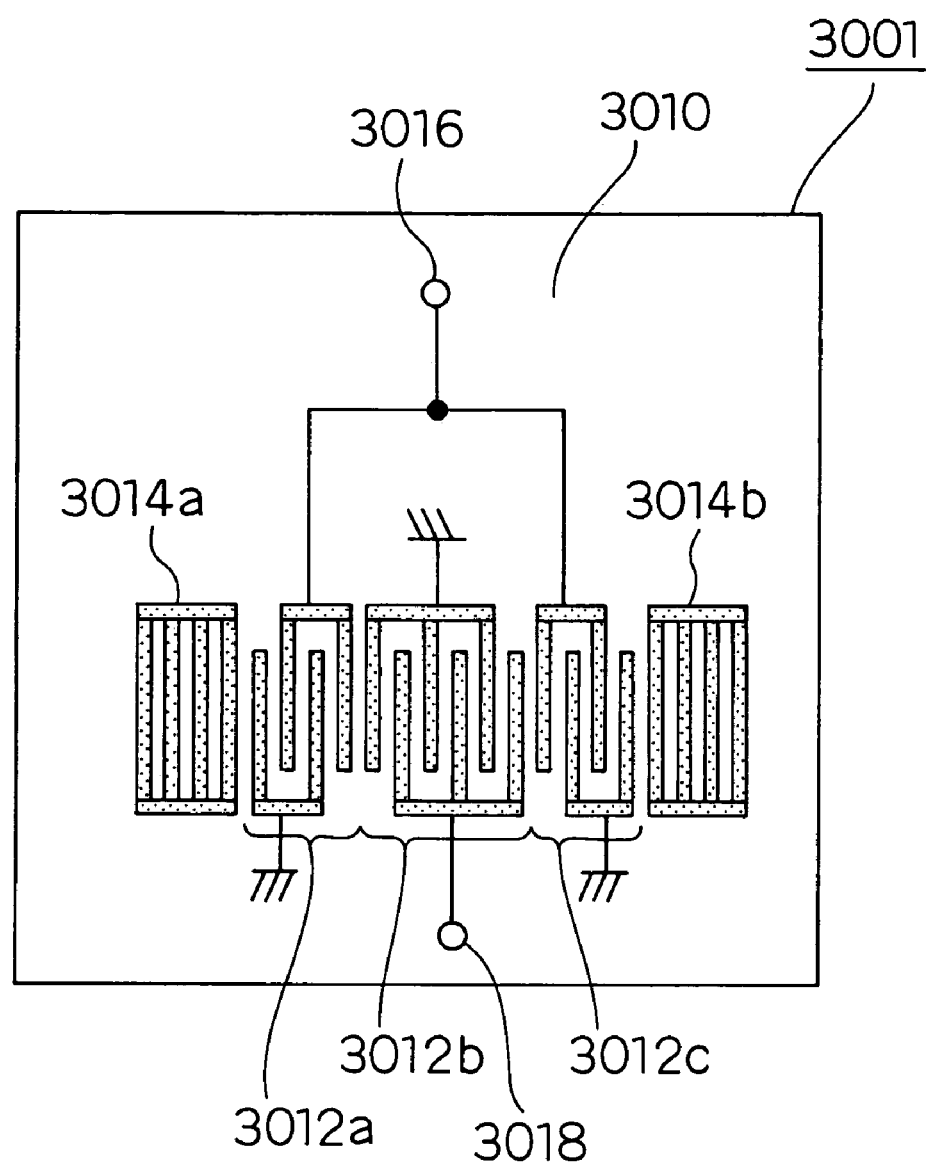
FIG. 24 is a schematic diagram for explaining a structure of a surface acoustic wave filter.
Figure 25:
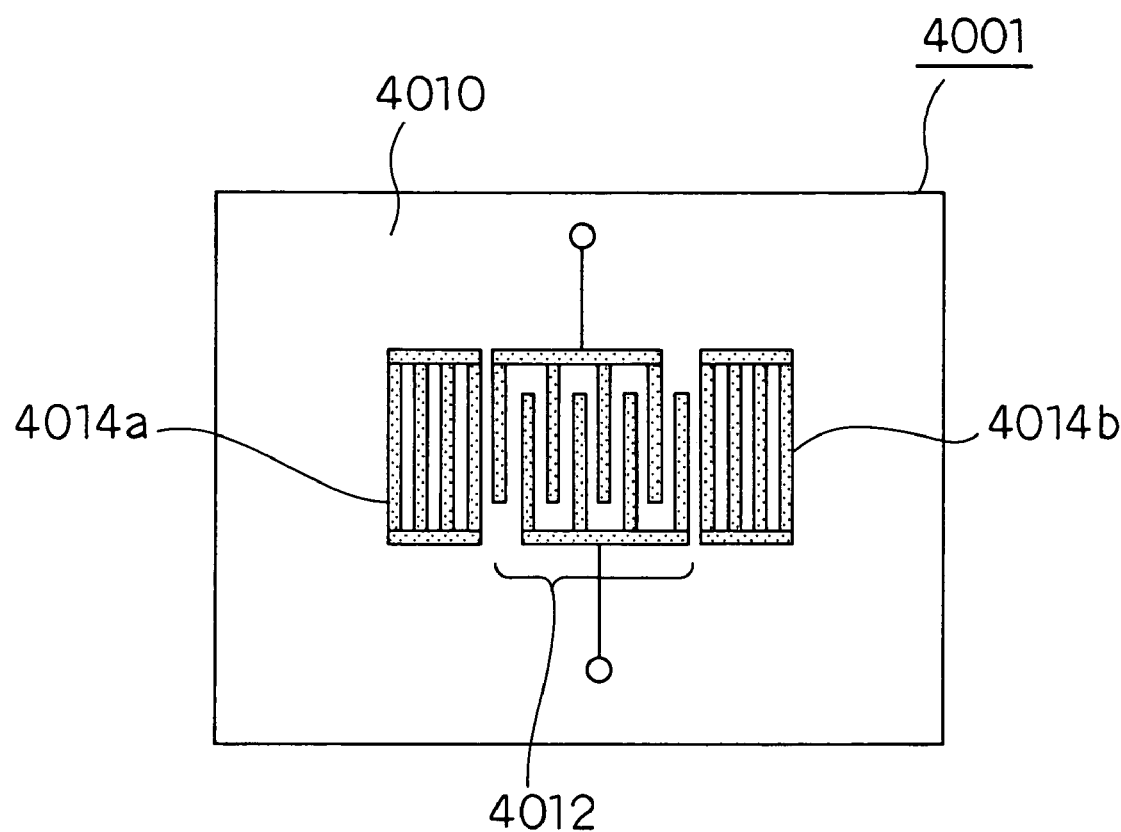
FIG. 25 is a schematic diagram for explaining a structure of a surface acoustic wave resonator.

FIG. 24 is a schematic diagram for explaining a structure of a surface acoustic wave filter 3001.

As shown in FIG. 24, the surface acoustic wave filter 3001 includes first to third IDT electrodes 3012a to 3012c, first and second reflector electrodes 3014a, b, an input terminal 3016, and an output terminal 3018 which are formed on a piezoelectric substrate 3010. The surface acoustic wave filter 3001 is a vertical mode filter which utilizes coupling of the IDT electrodes 3012a to 3012c arranged in proximity to each other on the piezoelectric substrate 3010.

Note that the example of realizing the transmission filter 1101 or the reception filter 1102 is described above according to a filter structure of FIG. 24. However, as another example, the constitution of connecting plural surface acoustic wave resonators 4001 (see FIG. 25) each other in a ladder type (see FIG. 23) or combination of serial and/or parallel connection may be allowed. In addition, the filter may be a filter using one resonator as a serial-type resonator or parallel-type resonator. As shown in FIG. 25, the surface acoustic wave resonator 4001 includes an IDT electrode 4012 formed on a piezoelectric substrate 4010, and reflector electrodes 4014a and 4014b are arranged on both sides of the IDT electrode 4012.

In addition, the filter structure is not limited to one using a piezoelectric, and a filter structure using a dielectric body may be adopted.

The description made in the above-described embodiments with reference to FIGS. 3, 5, 4 to 13, and 21 is about an example in which SAW filters are used in both the transmission filter 1101 and the reception filter 1102.

Note that, in the above examples, the description is made centering on the case in which a thin film resonator or a surface acoustic wave device is used as a transmission filter and/or a reception filter. The present invention is not limited to this, and the thin film resonator or the surface acoustic wave device can also applied to the first filter 403 and/or the second filter 404 of the diplexer 400 shown in FIG. 16.

As an example of the diplexer in this case, a diplexer includes: branching means of branching an input signal to be inputted to one side and the other side; a first filter of passing a signal of a first pass band of the signal branched to one side; and a second filter of passing a signal of a second pass band of the signal branched to the other side. In the diplexer, (1) an absolute value θ1 of a difference between a first phase of an impedance at a predetermined frequency of the pass band of the first filter at the time when the first filter side is viewed from the branching means and a second phase of an impedance at the predetermined frequency at the time when the second filter side is viewed from the branching means and/or (2) an absolute value θ2 of a difference between a third phase of an impedance at a predetermined frequency of the pass band of the second filter at the time when the second filter side is viewed from the branching means and a fourth phase of an impedance at the predetermined frequency at the time when the first filter side is viewed from the branching means is included in a range of 100 degrees or more and 170 degrees or less. The first filter and/or the second filter is a filter using a thin film resonator formed on a substrate. The filter of the diplexer may be a filter which utilizes coupling of thin film resonators arranged in proximity to each other on the substrate. The filter of the diplexer may be a filter which includes the constitution of connecting the thin film resonators each other in a ladder type (see FIG. 23) or combination of serial and/or parallel connection. In addition, the filter may be a filter using one resonator as a serial-type resonator or parallel-type resonator.

In addition, the first filter and/or the second filter of the diplexer may be a surface acoustic wave filter including IDT electrodes formed on a piezoelectric substrate.

Further, the surface acoustic wave filter of the diplexer may be a vertical mode filter which utilizes coupling of the IDT electrodes arranged in proximity to each other on the piezoelectric substrate.

Moreover, the surface acoustic wave filter of the diplexer may be a filter which includes the constitution of connecting surface acoustic wave resonators including the IDT electrodes each other in a ladder type (see FIG. 23) or combination of serial and/or parallel connection. In addition, the filter may be a filter using one resonator as a serial-type resonator or parallel-type resonator.

The antenna duplexer, the design method for the antenna duplexer, the production method for the antenna duplexer, the diplexer, the design method for the diplexer, the production method for the diplexer, and the communication apparatus in accordance with the present invention have an advantage that a signal loss can be reduced more compared with the conventional ones, and is useful as an antenna duplexer, a design method therefor, and the like.

What is claimed is:

1. An antenna duplexer coupled to an antenna terminal connected to an antenna, said antenna duplexer comprising:
   a transmission filter receiving a transmission signal and passing a first signal having a first predetermined pass band; and
   a reception filter receiving a reception signal obtained from said antenna terminal and passing a second signal having a second predetermined pass band,
   phase-shift circuit means provided between said antenna terminal and at least one of (1) said transmission fitter adjusting a phase of said transmission filter and (2) said reception filter adjusting a phase of said reception filter,
   wherein an absolute value of a phase difference is in a range between about 100 degrees and about 170 degrees, inclusive, and
   the absolute value of the phase difference is between at least one of (1) a first phase of an impedance toward said transmission filter and a second phase of an impedance toward said reception filter, each impedance viewed from said antenna terminal and at a predetermined frequency in said first pass band, and (2) a third phase of an impedance toward said reception filter and a fourth phase of an impedance toward said transmission filter, each impedance viewed from said antenna terminal and at a predetermined frequency in said second pass band.

2. A communication apparatus comprising:
   an antenna;
   the antenna duplexer according to claim 1 connected to said antenna;
   a transmission circuit connected to a transmission side of said antenna duplexer; and
   a reception circuit connected to a reception side of said antenna duplexer.

3. The antenna duplexer according to claim 1,
   wherein said transmission filter or said reception filter is a filter using thin film resonators formed on a substrate.

4. The antenna duplexer according to claim 3,
   wherein said filter is a filter which utilizes coupling of thin film resonators arranged in proximity to each other on said substrate.

5. The antenna duplexer according to claim 3,
   wherein said filter includes electrical means connecting said thin film resonators to each other.

6. The antenna duplexer according to claim 1,
   wherein said transmission filter or said reception filter is a surface acoustic wave filter including IDT electrodes formed in a piezoelectric substrate.

7. The antenna duplexer according to claim 6,
   wherein said surface acoustic wave filter is a vertical mode filter which utilizes coupling of said IDT electrodes arranged in proximity to each other on said piezoelectric substrate.

8. The antenna duplexer according to claim 6,
   wherein said surface acoustic wave filter includes a electrical means connecting surface acoustic wave resonators including said IDT electrodes.

9. A design method for an antenna duplexer comprising (1) a transmission filter receiving a transmission signal and passing a signal of a predetermined pass band; and (2) a reception filter receiving a reception signal obtained from an antenna and passing a signal of a predetermined pass band,
   wherein said design method for an antenna duplexer performs design of said antenna duplexer such that (a) a relation between a first phase of an impedance at a predetermined frequency of said pass band of said transmission filter at the time when said transmission filter side is viewed from an antenna terminal portion connecting said antenna and a second phase of an impedance at said predetermined frequency at the time when said reception filter side is viewed from said antenna terminal portion and/or (b) a relation between a third phase of an impedance at a predetermined frequency of said pass band of said reception filter at the time when said reception filter side is viewed from an antenna connection portion and a fourth phase of an impedance at said predetermined frequency at the time when said transmission filter side is viewed from said antenna terminal portion satisfies a fixed rule.

10. The design method for an antenna duplexer according to claim 9,
    wherein said antenna duplexer further comprises phase-shift circuit means (1) which is provided between said antenna terminal portion and said transmission filter and is used for adjusting a phase of said transmission filter and/or (2) which is provided between said antenna terminal portion and said reception filter and is used for adjusting a phase of said reception filter.

11. The design method for an antenna duplexer according to claim 10,
    wherein said design method performs design of said antenna duplexer such that said relation satisfies said fixed rule designing said phase-shift circuit means such that (1) an absolute value $\theta 1$ of a difference between said first phase and said second phase and/or (2) an absolute value $\theta 2$ of a difference between said third phase and said fourth phase is included in a predetermined range.

12. The design method for an antenna duplexer according to claim 11,
    wherein said predetermined range is between about 100 degrees and about 170 degrees, inclusive.

13. The design method for an antenna duplexer according to claim 12,
    wherein the design method for an antenna duplexer designs said antenna duplexer such that, when a phase of said pass band of said transmission filter is substantially 90 to 270 degrees, said absolute value $\theta 1$ is included in a range of between about 100 degrees and about 170 degrees, inclusive.

14. The design method for an antenna duplexer according to claim 12,
    wherein the design method for an antenna duplexer designs said antenna duplexer such that, when a phase of said pass band of said reception filter is substantially 90 to 270 degrees, said absolute value $\theta 2$ is included in a range of between about 100 degrees and about 170 degrees, inclusive.

15. The design method for an antenna duplexer according to claim 9,
    wherein said transmission filter or said reception filter is a filter using thin film resonators formed on a substrate.

16. The design method for an antenna duplexer according to claim 15,
    wherein said filter is a filter which utilizes coupling of said thin film resonators arranged in proximity to each other on said substrate.

17. The design method for an antenna duplexer according to claim 15,
    wherein said filter includes electrical means connecting said thin film resonators to each other.

18. The design method for an antenna duplexer according to claim 9,
wherein said transmission filter or said reception filter is a surface acoustic wave filter including IDT electrodes formed on a piezoelectric substrate.

19. The design method for an antenna duplexer according to claim 18,
wherein said surface acoustic wave filter is a vertical mode filter which utilizes coupling of said IDT electrodes arranged in proximity to each other on said piezoelectric substrate.

20. The design method for an antenna duplexer according to claim 18,
wherein said surface acoustic wave filter includes a electrical means connecting surface acoustic wave resonators including said IDT electrodes.

21. A production method for an antenna duplexer having a transmission filter receiving a transmission signal and passing a signal of a predetermined pass band; and a reception filter receiving a reception signal obtained from an antenna and passing a signal of a predetermined pass band, said production method comprising:
a design step of designing said antenna duplexer such that (1) a relation between a first phase of an impedance at a predetermined frequency of the pass band of said transmission filter at the time when said transmission filter side is viewed from an antenna terminal portion connecting said antenna and a second phase of an impedance at said predetermined frequency at the time when said reception filter side is viewed from said antenna terminal portion and/or (2) a relation between a third phase of an impedance at a predetermined frequency of said pass band of said reception filter at the time when said reception filter side is viewed from said antenna connection portion and a fourth phase of an impedance at said predetermined frequency at the time when said transmission filter side is viewed from said antenna terminal portion satisfies a fixed rule; and
an assembly step of assembling said designed antenna duplexer.

22. The production method for an antenna duplexer according to claim 21,
wherein said antenna duplexer further comprises phase-shift circuit means (1) which is provided between said antenna terminal portion and said transmission filter and is used for adjusting a phase of said transmission filter and/or (2) which is provided between said antenna terminal portion and said reception filter and is used for adjusting a phase of said reception filter.

23. The production method for an antenna duplexer according to claim 21,
wherein said transmission filter or said reception filter is a filter using thin film resonators formed on a substrate.

24. The production method for an antenna duplexer according to claim 21,
wherein said transmission filter or said reception filter is a surface acoustic wave filter including IDT electrodes formed in a piezoelectric substrate.

25. A diplexer comprising:
branching means branching an input signal to be inputted to one side and the other side;
a first filter passing a signal of a first pass band of said signal branched to one side; and
a second filter passing a signal of a second pass band of said signal branched to the other side;
phase-shift circuit means provided between said branching means and at least one of (1) said first filter adjusting a phase of said first filter and (2) said second filter adjusting a phase of said second filter,
wherein an absolute value of a phase difference is in a range between about 100 degrees and about 170 degrees, inclusive, and
the absolute value of the phase difference is between at least one of (1) a first phase of an impedance toward said first filter and a second phase of an impedance toward said second filter, each impedance viewed from said branching means and at a predetermined frequency in said first pass band, and (2) a third phase of an impedance toward said second filter and a fourth phase of an impedance toward said first filter, each impedance viewed from said branching means and at a predetermined frequency in said second pass band.

26. A design method for a diplexer comprising (1) branching means branching an input signal to be inputted to one side and the other side; (2) a first filter passing a signal of a first pass band of said signal branched to one side; and (3) a second filter passing a signal of a second pass band of said signal branched to the other side,
wherein said production method performs design of said diplexer such that (a) a relation between a first phase of an impedance at a predetermined frequency of said pass band of said first filter at the time when said first filter side is viewed from said branching means and a second phase of an impedance at said predetermined frequency at the time when said second filter side is viewed from said branching means and/or (b) a relation between a third phase of an impedance at a predetermined frequency of said pass band of said second filter at the time when said second filter side is viewed from said branching means and a fourth phase of an impedance at said predetermined frequency at the time when said first filter side is viewed from said branching means satisfies a fixed rule.

27. The design method for a diplexer according to claim 26,
wherein said branching filter further comprises phase-shift circuit means (1) which is provided between said branching means and said first filter and is used for adjusting a phase of said first filter and/or (2) which is provided between said branching means and said second filter and is used for adjusting a phase of said second filter.

28. A production method for a diplexer comprising: (1) branching means branching an input signal to be inputted to one side and the other side; (2) a first filter passing a signal of a first pass band of said signal branched to one side; and (3) a second filter passing a signal of a second pass band of said signal branched to the other side, the production method comprising:
a design step of designing said diplexer such that (a) a relation between a first phase of an impedance at a predetermined frequency of said pass band of said first filter at the time when said first filter side is viewed from said branching means and a second phase of an impedance at said predetermined frequency in at the time when said second filter side is viewed from said branching means and/or (b) a relation between a third phase of an impedance at a predetermined frequency of said pass band of said second filter at the time when said second filter side is viewed from said branching means and a fourth phase of an impedance at said predetermined frequency at the time when said first filter side is viewed from said branching means satisfies a fixed rule; and an assembly step of assembling said designed diplexer.

29. The production method for a diplexer according to claim 28, wherein said diplexer comprises phase-shift circuit means (1) which is provided between said branching means and said first filter and is used for adjusting a phase of said first filter and/or (2) which is provided between said branching means and said second filter and is used for adjusting a phase of said second filter.

* * * * *

UNITED STATES PATENT AND TRADEMARK OFFICE
CERTIFICATE OF CORRECTION

PATENT NO. : 7,034,635 B2
APPLICATION NO. : 10/829762
DATED : April 25, 2006
INVENTOR(S) : Hiroyuki Nakamura et al.

It is certified that error appears in the above-identified patent and that said Letters Patent is hereby corrected as shown below:

<u>Title Page, Item (56) References Cited, OTHER PUBLICATIONS</u>
In the Title of the Reference of H. Matsumoto et al.
Change "Burled" to -- Buried --

<u>Column 25</u>
Line 13, change "fitter" to -- filter --

<u>Column 27</u>
Line 14, delete "a"

Signed and Sealed this

Twelfth Day of February, 2008

JON W. DUDAS
*Director of the United States Patent and Trademark Office*